(12) United States Patent
Tomita et al.

(10) Patent No.: US 9,567,998 B2
(45) Date of Patent: Feb. 14, 2017

(54) WORKING OIL CHAMBER SEALING SYSTEM OF ROTARY VANE STEERING GEAR ACTUATOR

(71) Applicant: JAPAN HAMWORTHY & CO., LTD., Joto-ku, Osaka-shi, Osaka (JP)

(72) Inventors: Yukio Tomita, Osaka (JP); Toshiro Namatame, Osaka (JP); Takayuki Wakabayashi, Osaka (JP)

(73) Assignee: JAPAN HAMWORTHY & CO., LTD., Osaka (JP)

( * ) Notice: Subject to any disclaimer, the term of this patent is extended or adjusted under 35 U.S.C. 154(b) by 92 days.

(21) Appl. No.: 14/637,942

(22) Filed: Mar. 4, 2015

(65) Prior Publication Data
US 2015/0252804 A1    Sep. 10, 2015

(30) Foreign Application Priority Data

Mar. 5, 2014    (JP) ................................. 2014-042218

(51) Int. Cl.
| | |
|---|---|
| F01C 9/00 | (2006.01) |
| F04C 15/00 | (2006.01) |
| F16J 15/48 | (2006.01) |
| F04C 2/344 | (2006.01) |
| B63H 25/30 | (2006.01) |

(52) U.S. Cl.
CPC ........... *F04C 15/0007* (2013.01); *B63H 25/30* (2013.01); *F04C 2/344* (2013.01); *F16J 15/48* (2013.01)

(58) Field of Classification Search
CPC ............. F15B 15/12; F16J 15/46; F16J 15/48; F04C 2/356

USPC .................................................... 92/122, 124
See application file for complete search history.

(56) References Cited

U.S. PATENT DOCUMENTS

| | | | |
|---|---|---|---|
| 2,164,876 A * | 7/1939 | Horlacher | ............... F01C 19/00 92/124 |
| 4,475,738 A | 10/1984 | Eicher et al. | ............. 277/206 A |

FOREIGN PATENT DOCUMENTS

| | | | |
|---|---|---|---|
| EP | 1437296 A1 | 7/2004 | ............ B63H 25/30 |
| JP | 60-044606 | 3/1985 | ............ F15B 15/12 |
| JP | 3403694 B2 | 5/2003 | |
| JP | 2006-214496 | 8/2006 | ............ F16J 15/18 |
| JP | 4514617 B2 | 7/2010 | |
| JP | 2013-72447 | 4/2013 | ............ F15B 15/12 |
| JP | 2013-155766 | 8/2013 | ............ F16B 15/12 |
| JP | 2014-177155 | 9/2014 | ............ B63H 25/30 |

(Continued)

OTHER PUBLICATIONS

Office Action granting patent received in corresponding Japanese Patent Application No. 2014-042218, dated Mar. 24, 2015.

(Continued)

*Primary Examiner* — Michael Leslie
(74) *Attorney, Agent, or Firm* — Kusner & Jaffe

(57) ABSTRACT

A working oil chamber sealing system of a rotary vane steering gear actuator having a top end face of a respective segment of a housing that holds a segment top face horizontal seal. The segment top face horizontal seal having a sealing face which touches a rear face of a top cover. The top cover rear face holds an upper ring seal, a sealing face of which touches an outer circumferential edge of an upper end face of a rotor and also touches a sealing face inner edge of the segment top face horizontal seal and a sealing face inner edge of an upper horizontal vane seal of a rotor vane, respectively.

2 Claims, 18 Drawing Sheets

(56) References Cited

FOREIGN PATENT DOCUMENTS

WO     WO 95/12521     5/1995   ............. B63H 25/30

OTHER PUBLICATIONS

European Extended Search Report issued in corresponding European Patent Application No. 14169926.4, dated Sep. 25, 2015.
Office Action issued in corresponding Chinese Patent Application No. 201510101346.5 dated Nov. 10, 2016 (English-machine translation provided).
First Search Report issued in corresponding Chinese Patent Application No. 201510101346.5 dated Oct. 30, 2016.

* cited by examiner

FIG. 8

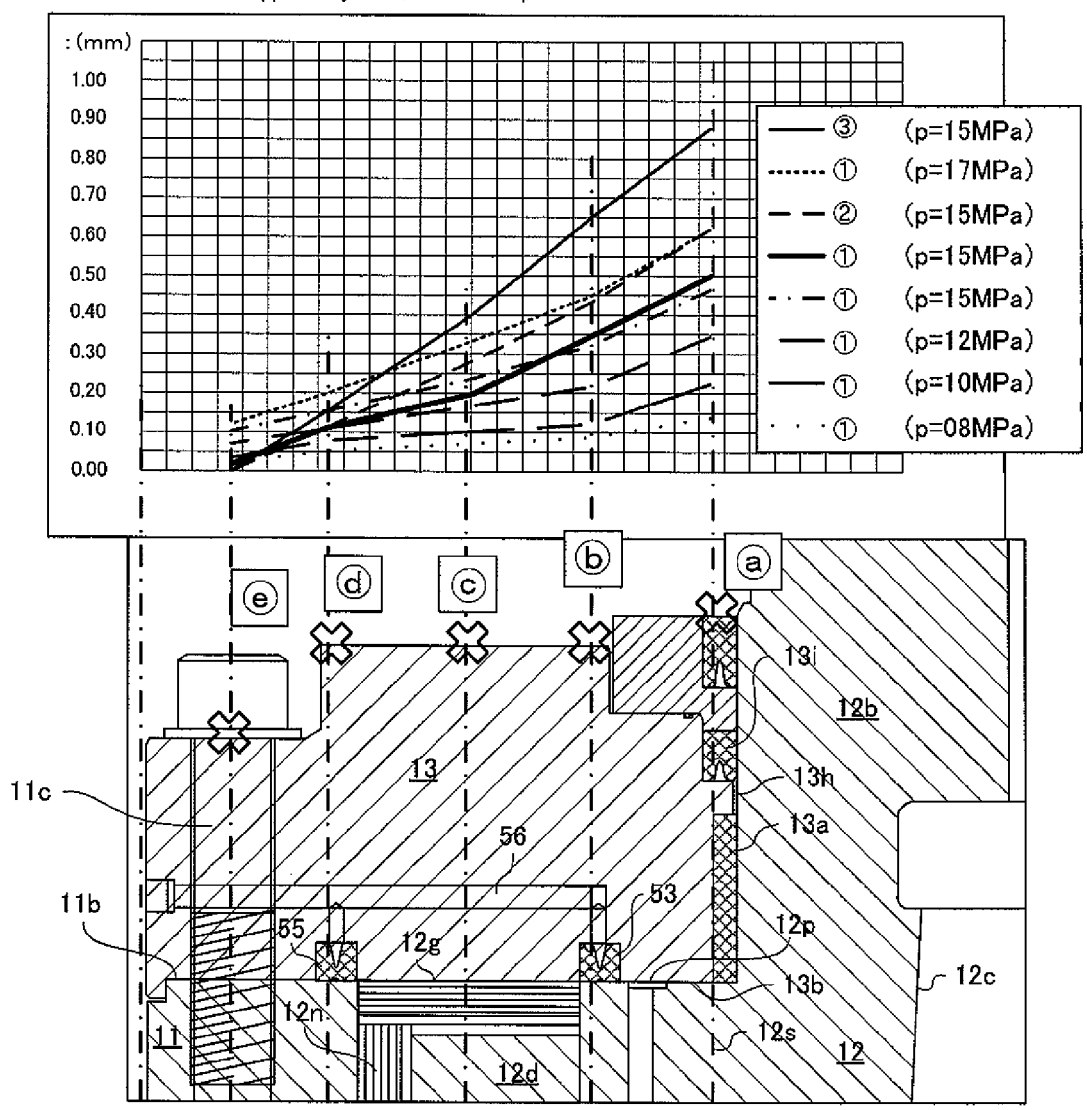

Measurement of Strain on Top Covers of Rotary Vane Steering Gears
[Legend] Tested Steering Gear Ranges: ① Model N-30 (2-vane),
②Model N-60 (3-vane), ③Model N-105 (3-vane)
Measured Points: ⓐ, ⓑ, ⓒ, ⓓ, ⓔ
Applied Hydraulic Pressure: p

| Ranges | Output Torque (at 8MPa) (t-m) | Dimension (mm) | | | Strain (mm)  (at p=15 MPa) | | | | |
|---|---|---|---|---|---|---|---|---|---|
| | | Rotor Dia. | Housing Internal Diameter | Height | ⓐ | ⓑ | ⓒ | ⓓ | ⓔ |
| ① | 30 | 580 | 760 | 420 | 0.50 | 0.35 | 0.20 | 0.10 | 0.00 |
| ② | 60 | 680 | 860 | 510 | 0.62 | 0.43 | 0.28 | 0.15 | 0.03 |
| ③ | 105 | 790 | 1130 | 570 | 0.88 | 0.65 | 0.40 | 0.15 | 0.00 |

| | | | | | | | | | |
|---|---|---|---|---|---|---|---|---|---|
| ① (at p=04MPa) | | | | | 0.00 | 0.00 | – | 0.00 | 0.00 |
| ① (at p=08MPa) | | | | | 0.14 | 0.08 | – | 0.05 | 0.02 |
| ① (at p=10MPa) | | | | | 0.22 | 0.12 | – | 0.07 | 0.05 |
| ① (at p=12MPa) | | | | | 0.34 | 0.22 | – | 0.11 | 0.07 |
| ① (at p=15MPa) | | | | | 0.47 | 0.32 | – | 0.15 | 0.10 |
| ① (at p=17MPa) | | | | | 0.62 | 0.45 | – | 0.20 | 0.12 |

FIG. 9

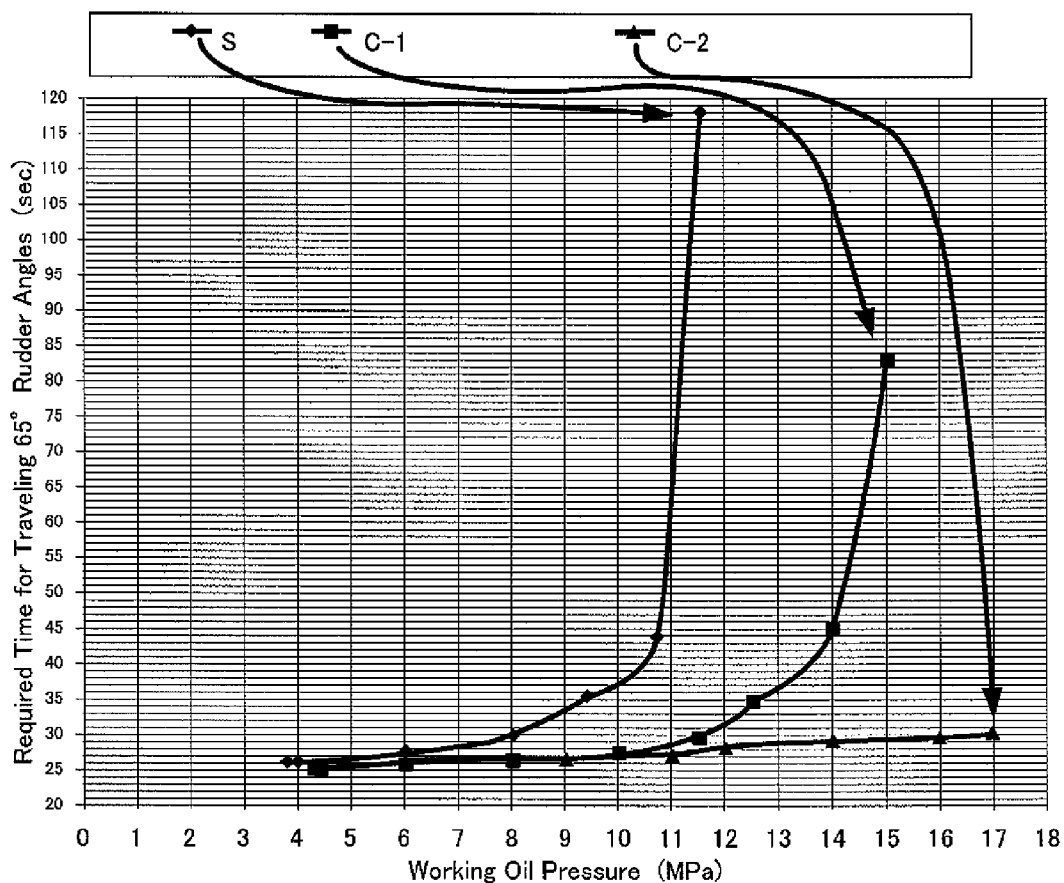

Relation between Working Oil Pressure and Required Time for Traveling 65° Rudder Angles by Model N-30 Rotary Vane Steering Gear

[Legend]
- S: Standard Model — The one by prior art
- C-1: Conversion 1 — The one, in which the mode for carrying out the present invention is applied to the Standard Model, but the upper outer ring seal 55 is excluded.
- C-2: Conversion 2 — The one, in which the upper outer ring seal 55 is added to the Conversion 1.

Inner Circumferential Side ⇐   ⇒ Outer Circumferential Side

WORKING OIL CHAMBER SEALING SYSTEM OF ROTARY VANE STEERING GEAR ACTUATOR

FIELD OF THE INVENTION

The present invention relates to technology of marine steering gears and, in particular, to a working oil chamber sealing system of a rotary vane steering gear actuator.

BACKGROUND OF THE INVENTION

A rotary vane steering gear actuator 1 of a prior art is such one as shown in FIGS. 14 to 22 for example, and contains a housing 11 and a rotor 12 rotatably accommodated inside the housing 11.

The housing 11 is mounted on a foundation by bolts via a flange portion 11a provided on the bottom circumference of the housing 11, and a top cover 13 is fitted on a ring shaped top end face 11b of the housing 11 by top cover fitting bolts 11c.

The rotor 12 is supported by the housing 11 in such a manner that a lower rotor shaft 12a is supported in the radial direction by a boss portion 11d provided on the bottom of the housing 11 via a radial bearing 11e, and an upper rotor shaft 12b is supported via a radial bearing 13a in the radial direction by a ring-shaped top cover 13 arranged so as to cover the upper opening of the housing 11. Furthermore, the lower end face of the rotor 12 is supported in the axial direction by the internal base 11f of the housing 11 via a thrust bearing 11g.

The rotor 12 has a central piercing hole 12c, pierced in the axial direction, into which a rudderstock head 14a of a rudderstock 14 is set and tightly fixated. The rotor 12 protrudes rotor vanes 12d of plural number (1–n) on the outer circumference of the rotor 12 at the equal circumferential intervals. Hereinafter explanation is made for a case of n=2.

The housing 11 protrudes segments 11h of the same number as the rotor vanes 12d on the inner circumference of the housing 11 at the equal circumferential intervals. The segments 11h are fitted in such a manner that its bottom end face 11i is contacted to the internal base 11f of the housing 11, and fastened thereto by bolts 11j piercing the boss portion 11d of the bottom of the housing 11. Furthermore, the segment top end face 11k of the segment 11h is contacted to the rear face 13b of the top cover 13, and fastened thereto by bolts 11m piercing the top cover 13.

As shown in FIGS. 14 to 16, the respective rotor vane 12d of the rotor 12 that is a motion body is provided with seals at the respective slidingly moving portions that is, a vertical vane seal 12n at the portion slidingly contacting the inner circumferential face 11n of the housing 11, an upper horizontal vane seal 12g at the portion slidingly contacting the rear face 13b of the top cover 13, and a lower horizontal vane seal 12j at the portion slidingly contacting the internal base 11f of the housing 11.

The respective upper horizontal vane seal 12g is held in an upper horizontal vane slit 12f formed on a vane upper end face 12e of the respective vane 12d, the respective lower horizontal vane seal 12j is held in a lower horizontal vane slit 12i formed on a vane lower end face 12h of the rotor vane 12d, and the respective vertical vane seal 12n is held in a vertical vane slit 12m formed on a vane radial end face 12k of the rotor vane 12d.

On the other hand, with respect to the segment 11h of the housing 11 that is a stationary body, as shown in FIGS. 14 to 16, only a vertical segment seal 11o is provided at the portion slidingly contacting the outer circumferential face 12o of the rotor 12, and the respective vertical segment seal 11o is held in a vertical segment slit 11q of the segment 11h formed on a segment radial end face 11p of the segment 11h. In this connection, a segment top end face 11k of the segment 11h is fixated to the rear face 13b of the top cover 13, and a segment bottom end face 11i of the segment 11h is fixated to the internal base 11f of the housing 11, respectively oil-tight.

The rotor 12 rotates in the housing 11 under a condition that a sealing face 12ga of the upper horizontal vane seal 12g slidingly contacts the rear face 13b of the top cover 13, a sealing face 12ja of the lower horizontal vane seal 12j slidingly contacts the internal base 11f of the housing 11, a sealing face 12na of the vertical vane seal 12n slidingly contacts the inner circumferential face 11n of the housing 11, and the outer circumferential face 12o of the rotor 12 slidingly contacts a sealing face 11oa of the vertical segment seal 11o of the segment 11h of the housing 11.

Hereby, a working oil chamber space 15 formed on the outer periphery of the rotor 12 is divided into working oil chambers 15a, 15b, 15c, 15d by the rotor vanes 12d and the segments 11h. In this connection, the working oil chamber 15a and the working oil chamber 15c (and the working oil chamber 15b and the working oil chamber 15d) that sit opposite to the rotating axis of the rotor 12 are communicatively connected each other. Accordingly, when working oil is supplied to the working oil chamber 15a, for instance, by an oil pump, the working oil is also supplied to the working oil chamber 15c that sits opposite to the rotating axis, and, at the same time, the working oil is excreted from the remaining working oil chambers 15b and 15d, and returned to the oil pump side. Thus, revolution of the rotor 12 by working oil pressure is concluded.

As shown in FIGS. 15, and 17 to 19, the internal base 11f of the housing 11 has a ring-shaped lower ring slit 11r, extending over the whole circumference, on a portion opposing to an outer circumferential portion of the lower end face of the rotor 12, and a lower ring seal 11s is held in the lower ring slit 11r. A sealing face 11sb of the lower ring seal 11s slidingly contacts the outer circumferential portion of the lower end face of the rotor 12. By this constitution, oil-tightness of the respective portions of the working oil chambers 15a, 15b, 15c, 15d where the outer circumferential portion of the lower end face of the rotor 12 contacts the internal base 11f of the housing 11 is secured.

Furthermore, the rear face 13b of the top cover 13 has a ring-shaped upper ring slit 13c, extending over the whole circumference, on a portion opposing to an outer circumferential portion of the upper end face of the rotor 12, and an upper ring seal 13d is held in the upper ring slit 13c. A sealing face 13db of the upper ring seal 13d slidingly contacts the outer circumferential portion of the upper end face of the rotor 12 oil-tight.

In this connection, as shown in FIGS. 18 and 19, the sealing face outer edge 11sc of the sealing face 11sb of the lower ring seal 11s contacts the sealing face lower edge 11od of the sealing face 11oa of the vertical segment seal 11o of each segment 11h, and the sealing face inner edge 12jb of the sealing face 12ja of the lower horizontal vane seal 12j of each rotor vane 12d, respectively, and leakage of the working pressure oil at the respective contacting portions is prevented.

Furthermore, as shown in FIGS. 15 and 17, the sealing face outer edge 13dc of the sealing face 13db of the upper ring seal 13d contacts the sealing face upper edge 11oe of the sealing face 11oa of the vertical segment seal 11o of each segment 11h, and the sealing face inner edge 12gb of the sealing face 12ga of the upper horizontal vane seal 12g of each rotor vane 12d respectively, and leakage of the working pressure oil at the respective contacting portions is prevented.

In this connection, the upper horizontal vane seal 12g, the lower horizontal vane seal 12j and the vertical vane seal 12n of the rotor vane 12d, the vertical segment seal 11o of the segment 11h, and the lower and the upper ring seals 11s, 13d are made of elastic material such as polymer, and have such cross sectional profile as shown in FIGS. 20 and 21.

The abovementioned seals of the upper horizontal vane seal 12g, the lower horizontal vane seal 12j and the vertical vane seal 12n of the rotor vane 12d of the rotor 12, the vertical segment seal 11o of the segment 11h of the housing 11, the lower ring seal 11s of the housing 11, and the upper ring seal 13d of the top cover 13 are so devised that their respective sealing faces are pushed against the respective opposite faces by force of the hydraulic pressure in order to increase sealing effect at the respective slidingly contacting portions, and, for this sake, the working pressure oil is led to the respective rear faces of the respective seals 12g, 12j, 12n, 11o, 11s, 13d from the working oil chambers 15a,15c (or 15b,15d) that have become high pressure side.

There are various versions in the means for introducing the working pressure oil from the working oil chambers 15a, 15c (or 15b, 15d) that have become high pressure side to the respective rear faces of the seals 12g, 12j, 12n, 11o, 13d, but the hereinafter explained is of the means that constitutes the background technology of the present invention.

As shown in FIG. 22, hydraulic lines 16a are provided outside the actuator 1 so that they communicatively connect the set of the working oil chambers 15a and 15c that sit opposite to the rotating axis, and are communicatively connected each other, and the set of the working oil chambers 15b and 15d that sit opposite to the rotating axis, and are communicatively connected each other, respectively, and a pressure valve 16 is provided in the respective hydraulic line 16a so that pressure oil is extracted from the working oil chambers 15a, 15c or the working oil chambers 15b, 15d, that have become pressure side, through either pressure valve 16.

As shown in FIGS. 15 and 17, the extracted working pressure oil is communicatively connected to a rotor upper face oil groove 12p of ring-shape provided on the upper end face of the rotor 12 through an oil passage 13e penetrating the top cover 13, and at the same time, communicatively connected to the rear faces 11oc of the vertical segment seals 11o of the housing segments 11h through an oil passage 13f branched from the said oil passage 13e penetrating the top cover 13.

As shown in FIG. 17, the said upper face oil groove 12p provided on the upper end face of the rotor 12 is communicatively connected to the rear face 13da of the upper ring seal 13d through an oil groove 13g provided on an inner side face of the upper ring slit 13c of the top cover 13.

As shown in FIG. 18, a rotor lower face oil groove 12q of ring-shape provided on the lower end face of the rotor 12 is communicatively connected to the rotor upper face oil groove 12p through a balancing hole 12r piercing the rotor 12 from the upper end face to the lower end face. The rotor lower face oil groove 12q of the rotor 12 is communicatively connected to the rear face 11sa of the lower ring seal 11s through an oil groove 11t provided on an inner side face of the lower ring slit 11r of the housing 11. Furthermore, as shown in FIGS. 15 and 19, an oil passage 12s is provided so as to communicatively connect the said rotor upper face oil groove 12p with the rear face 12nb of the vertical vane seal 12n of the rotor vane 12d.

In this connection, such constitution is applied that the rear face 12nb of the vertical vane seal 12n is communicatively connected to the rear face 12gc of the upper horizontal vane seal 12g and the rear face 12jc of the lower horizontal vane seal 12j, respectively, in the state that the vertical vane seal 12n, the upper horizontal vane seal 12g and the lower horizontal vane seal 12j of the rotor vane 12d are assembled, and hence, the working pressure oil led to the rear face 12nb of the vertical vane seal 12n is simultaneously led to the rear face 12gc of the upper horizontal vane seal 12g and the rear face 12jc of the lower horizontal vane seal 12j.

In the abovementioned configuration, such measures are taken that an upper gland sealing device 13i is provided, as shown in FIG. 15, in order that the working pressure oil led to the oil groove 13g provided on the inner side face of the upper ring slit 13c, and the working pressure oil in the working oil chambers 15a, 15c (or 15b, 15d) that has become high pressure side that may leaks over the sealing face 13db of the upper ring seal 13d are prevented from leaking to the outside through a central penetrating hole 13h of the top cover 13 that loosely fits the upper rotor shaft 12b of the rotor 12, and similarly for the lower side, a lower gland sealing device 11v is provided, as shown in FIG. 15, in order that the working pressure oil led to the oil groove 11t provided on the inner side face of the lower ring slit 11r, and the working pressure oil in the working oil chambers of high pressure side that may leaks over the sealing face 11sb of the lower ring seal 11s are prevented from leaking to the outside through a central penetrating hole 11u of the boss portion 11d of the bottom of the housing 11 that loosely fits the lower rotor shaft 12a of the rotor 12.

In this connection, as shown in FIGS. 20 and 21, the respective rear faces 12gc, 12jc, 12nb, 11oc of the straight line seals 12g, 12j, 12n, 11o are provided with lips 17s, respectively, and the respective rear faces 13da, 11sa of the ring seals 13d, 11s are provided with lips 17r, respectively, so that the working pressure oil led to the respective rear faces 12gc, 12jc, 12nb, 11oc, 13da, 11sa may not leak to the low pressure side through the side of the respective slits 12f, 12i, 12m, 11q, 13c, 11r.

A circuit of a hydraulic system 2 that operates the abovementioned rotary vane steering gear actuator 1 is such one, for example, as shown in FIG. 22. Main components constituting the hydraulic circuit are an oil pump 21, a steering direction changeover valve 22 with a solenoid valve 23 that operates the steering direction changeover valve 22, pilot-operated non-return valves for port side and starboard side 24p, 24s, flow regulating valves for port side and starboard side 25p, 25s, an oil tank 26, a main hydraulic line for port side 27p and a main hydraulic line for starboard side 27s that connect respective outlets of the steering direction changeover valve 22 to the actuator 1. In this connection, such a system is adopted that the pilot pressure oil for operating the steering direction changeover valve 22 is produced by an independent pilot oil pump 29.

The oil pump 21 is of one way constant discharge type, and hence, changeover of operating direction of the actuator 1 to either port side or starboard side is performed by changing over the oil lines by the steering direction changeover valve 22. After operating the actuator 1, the working oil returns to the oil tank 26 through the steering direction changeover valve 22, a return line 30 and a return filter 31. Furthermore, the steering direction change-over valve 22 also performs such function, when the actuator 1 is not put into operation, as to return the discharged oil from the oil pump 21 to the oil tank 26 through the steering direction changeover valve 22.

The pilot-operated non-return valves for port side and starboard side 24p, 24s perform such function that, when the actuator 1 is put into operation namely, when discharged oil from the oil pump 21 is pressurized, the pilot-operated non-return valves for port side and starboard side 24p, 24s open the main hydraulic lines 27p, 27s, and, when the actuator 1 is not put into operation, the pilot operated non-return valves 24p, 24s act non-returning function for shutting the working oil in the working oil chambers 15a, 15b, 15c, 15d of the actuator 1, by which the rotor 12 is fixated namely, the rudderstock head 14a of the rudderstock 14 is fixated.

The flow regulating valves for port side and starboard side 25p, 25s are provided for making motion of the actuator 1 smooth by adding resistance to the flow of working oil in either main hydraulic line for port side 27p or main hydraulic line for starboard side 27s that becomes the flowing-outside from the actuator 1, namely, returning side to the oil tank 26.

Furthermore, the adjoining working oil chambers 15a and 15d (namely, the adjoining working oil chambers 15b and 15c) are connected each other, with shock absorbing valves 28p, 28s being interposed between both working oil chambers. And, such a measure is taken that, when the working oil chambers 15a, 15b, 15c, 15d are locked by the pilot operated non-return valves 24p, 24s, and, if, in such a state, abnormally large force acts on a rudder, the shock absorbing valve 28p or 28s will act so as to relieve the working pressure oil of the working oil chambers 15a, 15c or 15b, 15d that become high pressure side into the working oil chambers 15b,15d or 15a,15c that are of low pressure side.

In this connection, the aforementioned hydraulic lines 16a led to the pressure valves 16 provided outside the actuator 1 for extracting the working pressure oil from either working oil chambers 15a, 15c or working oil chambers 15b, 15d that become high pressure side for leading it to the rear faces of the respective seals are so provided as to communicatively connect to the respective entrance to the shock absorbing valves 28p, 28s.

In the rotary vane steering gear actuator 1 of the above-mentioned constitution, it is necessary, in order to secure oil-tightness of the respective working oil chambers 15a, 15b, 15c, 15d, that the rotor vane 12d of the rotor 12, that is a motion body, is provided with the vertical vane seal 12n at the portion slidingly contacting with the inner circumferential face 11n of the housing 11, the upper horizontal vane seal 12g at the portion slidingly contacting with the rear face 13b of the top cover 13, and the lower horizontal vane seal 12j at the portion slidingly contacting with the internal base 11f of the housing 11.

In contrast, for the segment 11h of the housing 11, that is a stationary body, it is necessitated to be only provided with the vertical segment seal 11o at the portion slidingly contacting with the outer circumferential face 12o of the rotor 12, and the segment top end face 11k and the segment bottom end face 11i of the segment 11h are fixated oil-tight to the rear face 13b of the top cover 13 and the internal base 11f of the housing 11, respectively, in the following manner.

The segment bottom end face 11i of the segment 11h is fixated oil-tight to the internal base 11f of the housing 11, using a bonding agent. In contrast, as for the segment top end face 11k of the segment 11h that contacts the rear face 13b of the top cover 13, such measures have been taken that oil-tightness at the said contacting face is secured by giving dense contact to the contacting faces by means of heightening preciseness of finishing touch of the contacting faces.

The reason why is that fixation by a bonding agent is impossible because it is necessary for the top cover 13 to be attachable and detachable. Furthermore, such measures are generally not adopted that a packing sheet is inserted between the segment top end face 11k of the segment 11h and the rear face 13b of the top cover 13 that contact each other because the upper face part of the housing 11 that contacts the rear face 13b of the top 10 cover 13 is complicated in shape and of large area.

In addition, the top cover 13 is a ring-shaped plate arranged so as to cover the upper opening of the housing 11, with the upper rotor shaft 12b of the rotor 12 being loosely fitted in the central portion of the top cover 13, and has such configuration that its circumferential portion is fitted to the top end face 11b of the housing 11 by the top cover fitting bolts 11c. Accordingly, when hydraulic pressure of the working oil chambers 15a to 15d functions to the rear face 13b of the top cover 13, the top cover 13 behaves itself like a ring-shaped cantilever, with the portion of the circumferentially arranged top cover fitting bolts 11c being as fulcrums.

Accordingly, when hydraulic pressure is generated in the working oil chambers 15a 15d, the top cover 13 is so deformed that its inner circumferential portion is lifted up, with the portion of the circumferentially arranged top cover fitting bolts 11c being as fulcrums. Generation of this deformation is unavoidable more or less, so long as Young's Modulus of the material is not infinite.

For this reason, it is unavoidable that a clearance is generated more or less between the top end face 11k of the segment 11h and the rear face 13b of the top cover 13, and the working pressure oil in the working oil chambers 15a, 15c (or 15b, 15d) that becomes high pressure side leaks into the working oil chambers 15b, 15d (or 15a, 15c) that becomes low pressure side through such a clearance portion.

Accordingly, such a measure has been taken so far that discharging quantity of an oil pump is increased in advance as much as the quantity of leakage of the working pressure oil can be compensated. In this connection, such a clearance is also generated at the portions between the rear face 13b of the top cover 13 and the upper end face of the rotor 12, and between the said rear face 13b and the vane upper end face 12e of the rotor vane 12d, but leakage of the working pressure oil can be prevented by virtue that the upper ring seal 13d and the upper horizontal vane seal 12g follow in the wake of the clearance.

The higher the working oil pressure becomes, the more an amount of this clearance is created. By this reason, there has been a problem that, when it is intended to heighten working oil pressure, an amount of this clearance becomes too large to cope with this only by means of increase in quantity of oil pump discharge, and there would be a case that the leakage of the high pressure working oil obstructs to create high pressure to a certain extent.

In order to repress an amount of this clearance, such various countermeasures have been considered as increasing thickness of the top cover 13, adding plenty of ribs, increasing diameter and number of the bolts 11m for fitting the segment top end face 11k to the rear face 13b of the top cover 13, etc., but any means is restrictive for practical use because of resultant too heavy construction.

Furthermore, there has been a problem that, if material of small Young's Modulus is used for the top cover 13, an amount of the said clearance becomes larger, since, even if strength is enough, strain of the material becomes large, and hence, other material than that of large Young's Modulus is unavailable.

Furthermore, there has been a problem that generation of the said clearance weakens endurability to a phenomenon of creeping in operation of a steering gear. That is, when a rudder has reached a certain demanded angle position in response to a steering order, the rudder should be sustained at the demanded angle position in such a manner that the steering direction changeover valve 22 comes to the neutral position, and the respective working oil chambers 15a-15d of the actuator 1 are locked by function of the pilot-operated non-return valves 24p, 24s. But, in this state, the working oil in the working oil chambers of high pressure side leaks into the working oil chambers of low pressure side through the said clearance more or less, and the rudder moves as much as equivalent to an amount of the leakage. This is so-called a creeping phenomenon.

When a creeping phenomenon occurs, the steering gear detects it, and acts so as to make the rudder return to the original demanded angle position again. But, when the 12 rudder has returned to the original angle position and the working oil chambers 15a-15d of the actuator 1 have been locked, a creeping phenomenon is generated again by leakage of the working oil through the said clearance, and the steering gear performs returning action to the original angle position.

There has been a problem that this repetition of the generation of a creeping phenomenon and the returning action of the steering gear actuator 1 forces the actuator 1 to ceaselessly operate, and damages its durability.

Because of the existence of the abovementioned various problems, it has been regarded that the maximum working oil pressure of rotary vane steering gears is to be 80 kg/cm$^2$, in general, and higher pressure than it is unavailable. In order to make the working oil pressure higher than 80 kg/cm$^2$, it is necessitated to resolve the abovementioned various problems.

Furthermore, when considering further high pressurization, there has been a further question. That is, though the segment 11h of the housing 11 is fixated in such a manner that, as aforementioned, its top end face 11k is fastened to the rear face 13b of the top cover 13 by the bolts 11m, and its bottom end face 11i is fastened to the internal base 11f of the housing 11 by the bolts 11j, the segment 11h develops a tendency to be transferred so as to be lifted upward, through the abovementioned bolts 11m at the segment top end face 11k, and opposing the tensile force of the abovementioned bolts 11j at the segment bottom end face 11i, in conjunction with the aforementioned upward transformation of the top cover 13 as a ring-shape cantilever, with the portions of the circumferentially arranged top cover fitting bolts 11c being as fulcrums, when hydraulic pressure is generated in the working oil chambers 15a-15d.

Thus there has been such a question that, depending on magnitude of the working oil pressure, a harmful clearance may be created between the bottom end face 11i of the segment 11h and the internal base 11f of the housing 11, and the working oil can leak through this clearance from the working oil chambers of high pressure side to the working oil chambers of low pressure side.

Hence there has been possibility of causing the problems similar to the problems caused by the abovementioned generation of a clearance on the top 11k of the segment 11h.

The present invention resolves the aforementioned problems and aims at offering such a working oil chamber sealing system of a rotary vane steering gear actuator as to be able to secure oil-tightness between the working oil chambers 15a, 15c (or 15b, 15d) that have become high pressure side and the working oil chambers 15b, 15d (or 15a, 15c) that have become low pressure side, in spite of unavoidable generation of a clearance, more or less, between the rear face 13b of the top cover 13 and the top end face 11k of the housing segment 11h by the hydraulic pressure generated in the working oil chambers 15a-15d of the rotary vane steering gear actuator 1, and, even if a harmful clearance has been generated, depending on magnitude of the working oil pressure, between the bottom end face 11i of the segment 11h of the housing 11 and the internal base 11f of the housing 11.

In order to resolve the aforementioned problems, the present invention of a working oil chamber sealing system of a rotary vane steering gear actuator is constituted so that: in a rotary vane steering gear actuator that is composed of a rotor, into which a rudderstock is fitted, a housing that accommodates the rotor and forms space for working oil chambers in the circumferences of the rotor, and a ring-shaped top cover arranged at an upper opening of the housing, with its circumferential edge portion being fixated to a housing top face circumferential edge portion by bolts, extending over the whole circumference and is so constituted that the rotor has plural vanes arranged protrusively on the outer periphery at equal intervals along the circumferential direction, the housing has plural segments arranged protrusively on the inner periphery at equal intervals along the circumferential direction, the aforementioned space for working oil chambers is divided into plural working oil chambers by the vanes and the segments, the top cover has a ring-shaped upper ring slit on the top cover rear face at the portion opposing to the outer circumferential edge of the upper end face of the rotor, and an upper ring seal that touches the upper end face of the rotor is held in the upper ring slit, the housing has a ring-shaped lower ring slit on the housing internal base at the portion opposing to the outer circumferential edge of the lower end face of the rotor, and a lower ring seal that touches the lower end face of the rotor is held in the lower ring slit, the respective vane of the rotor has an upper horizontal vane slit, extending in the radial direction, on the vane upper end face opposing to the rear face of the top cover, and an upper horizontal vane seal that touches the rear face of the top cover is held in the upper horizontal vane slit, the respective vane of the rotor has a lower horizontal vane slit, extending in the radial direction, on the vane lower end face opposing to the internal base of the housing; and a lower horizontal vane seal that touches the internal base of the housing is held in the lower horizontal vane slit, and the respective vane of the rotor has a vertical vane slit, extending in the axial 15 direction, on the vane radial end face opposing to the inner circumferential face of the housing, and a vertical vane seal that touches the inner circumferential face of the housing is held in the vertical vane slit, with the upper end face of the vertical vane seal touching the rear face of the upper horizontal vane seal, and the lower end face of the vertical vane seal touching the rear face of the lower horizontal vane seal and the respective segment of the housing has a vertical segment slit, extending in the axial direction, on the segment radial end face opposing to the outer circumferential face of the rotor, and a vertical segment seal that touches the outer circumferential face of the rotor is held in the vertical segment slit, with its top end face being pressure contacted to the rear face of the top cover, and its bottom end face being pressure contacted to the internal base of the housing the respective segment of the housing has a segment top face horizontal slit, that is continuatively connected with the vertical segment slit, and extends in the radial direction, on the segment top end face opposing to the rear face of the top cover, and a segment top face horizontal seal that touches the rear face of the top cover is held in the segment top face horizontal slit, with the upper end face of the vertical segment seal being contacted to the rear face of the segment top face horizontal seal, the segment top face horizontal seal has the same cross sectional profile as that of the vertical segment seal, space of the rear face of the vertical segment seal and space of the rear face of the segment top face horizontal seal are communicatively connected each other at the connected portion between the segment top face horizontal seal and the upper end of the vertical segment seal, the top cover has a ring-shaped upper outer ring slit on the top cover rear face in the outer circumferential side in concentricity with the aforementioned upper ring slit at the portion opposing to the inner circumferential edge of the top end face of the housing, and an upper outer ring seal that touches the top end face of the housing is held in the upper outer ring slit, the sealing face inner edge of the segment top face horizontal seal contacts the ring sealing face outer edge of the aforementioned upper ring seal, and the sealing face outer edge of the segment top face horizontal seal contacts the ring sealing face inner edge of the upper outer ring seal, with the ring sealing face inner edge of the upper outer ring seal simultaneously also touching the sealing face outer edge of the upper horizontal vane seal and the respective rear faces of the aforementioned each seal are applied with the pressure oil led from the working oil chambers that become high pressure side, and the respective sealing faces and the sealing face edges are pushed against the respective mate faces and the mate edges by the hydraulic pressure.

Furthermore, the following is added to the constitution of a working oil chamber sealing system of a rotary vane steering gear actuator in accordance with the present invention.

Namely, the respective segment of the housing has a segment bottom face horizontal slit, that is continuatively connected with the vertical segment slit, and extends in the radial direction, on the segment bottom end face opposing to the internal base of the housing, and a segment bottom face horizontal seal is held in the segment bottom face horizontal slit, the segment bottom face horizontal seal has the same cross sectional profile as that of the vertical segment seal, space of the rear face of the vertical segment seal and space of the rear face of the segment bottom face horizontal seal are communicatively connected each other at the connected portion between the segment bottom face horizontal seal and the lower end of the vertical segment seal, a sealing face of the segment bottom face horizontal seal touches the internal base of the housing, a rear face of the segment bottom face horizontal seal touches the lower end face of the vertical segment seal, an inner edge of the sealing face of the segment bottom face horizontal seal contacts the outer edge of the ring sealing face of the lower ring seal, an outer end face of the segment bottom face horizontal seal contacts the inner circumferential face of the housing and the rear face of the segment bottom face horizontal seal is applied with the pressure oil led from the working oil chambers that become high pressure side, and the sealing face and the inner edge of the sealing face of the segment bottom face horizontal seal are pushed against the mate face and the mate edge, respectively, by the hydraulic pressure.

Thanks to the aforementioned constitution in accordance with the present invention, a rotary vane steering gear actuator can be prevented, in spite of creation of a clearance between the top end face of the housing segment and the top cover rear face by force of hydraulic pressure generated in the working oil chambers, from leakage of the working oil through the said clearance, and oil-tightness between the working oil chambers can be secured, by virtue of the function of the segment top face horizontal seal, the upper ring seal and the upper outer ring seal. Accordingly, it becomes possible to heighten the working oil pressure of a rotary vane steering gear, and furthermore, it becomes possible to heighten steering gear durability by virtue of increased endurability against a creeping phenomenon in steering gear operation.

In the rotary vane steering gears in accordance with the present invention, it is further possible to heighten the working oil pressure to higher than 160 kg/cm$^2$, in contrast with the rotary vane steering gears of 2-segment type and 3-segment type of a prior art, in which the working oil pressure maximum has been 80 kg/cm$^2$.

Furthermore, it becomes possible to employ such top cover constitution as to use material of low Young's Modulus, such as steel plate welded construction, etc., as an amount of generation of the said clearance does not come to be influential.

Furthermore, in the rotary vane steering gears in accordance with the present invention, it becomes unnecessary to make an oil pump discharge an extra amount, coping with the said leaking amount, since, in spite of generation of a clearance between the top end face of the housing segment and the rear face of the top cover, leakage of the working oil through the said clearance comes to be null.

Furthermore, even if a harmful clearance is generated between the bottom end face of the housing segment and the internal base of the housing, depending on magnitude of the working oil pressure, similar effect can be exhibited, by virtue that leakage of the working oil between the working oil chambers through the said clearance can be prevented, to that brought by the countermeasure against the generation of a clearance at the top end face of the housing segment.

BRIEF DESCRIPTION OF DRAWINGS

FIG. 8 shows measured data of strain generated in the axial direction on the actuator top cover under loaded condition with respect to actual rotary vane steering gears of various model and various output torque;

FIG. 9 shows measured data on variation of required time for steering, which means variation of a leaked amount of the working oil inside the actuator, vs. variation of working oil pressure with respect to an actual rotary vane steering gear in accordance with the mode for carrying out the present invention;

DETAILED DESCRIPTION OF THE PREFERRED EMBODIMENT

Figure 1:
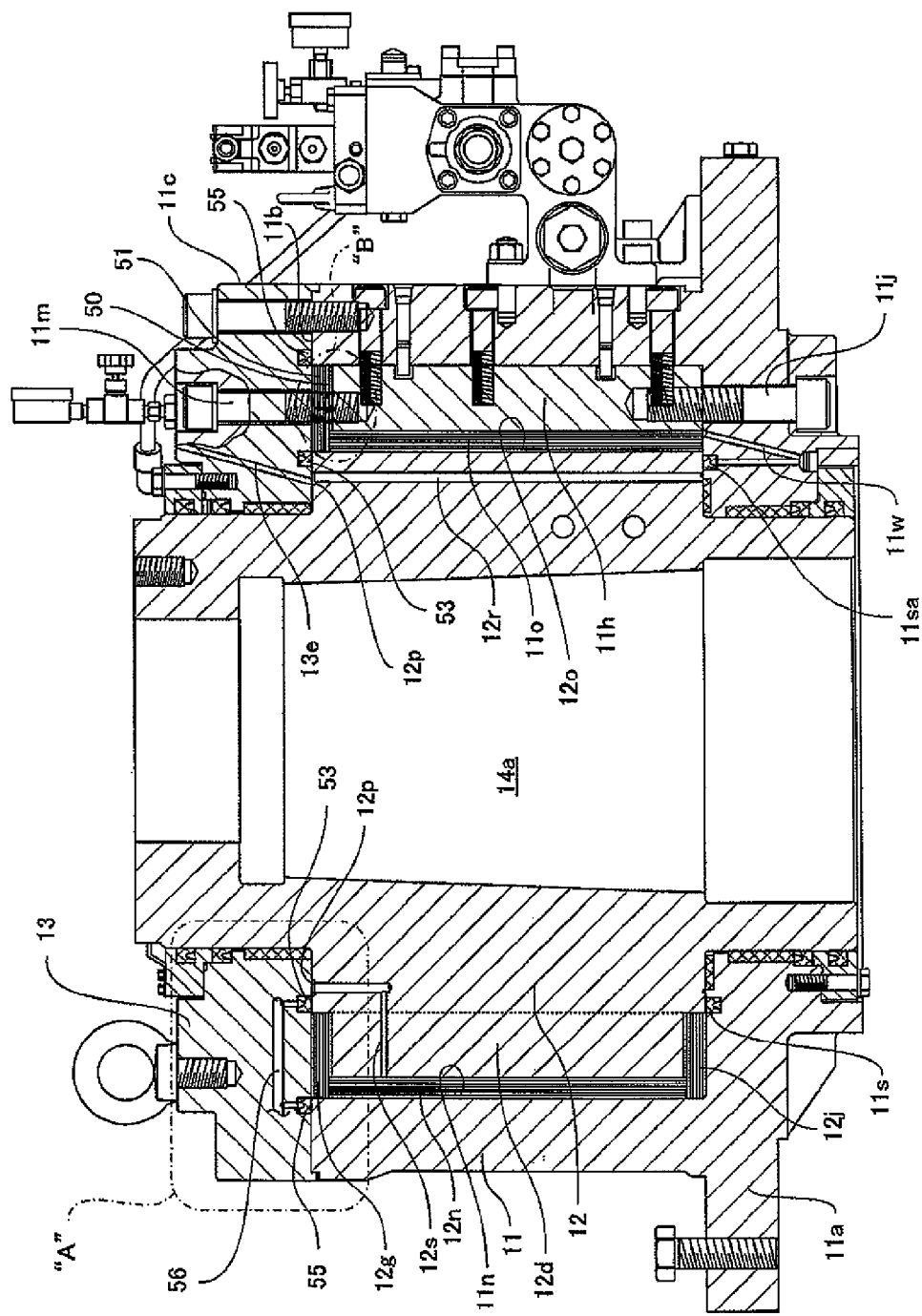
FIG. 1 shows a vertically sectioned front view of a rotary vane steering gear actuator in accordance with the mode for carrying out the present invention.

The mode for carrying out the present invention is described and illustrated below with reference to the accompanying drawings. Regarding the members that basically act similar function to the arts above explained in FIGS. 14 to 22, explanation is omitted, with the same reference letters and numbers being affixed.

As shown in FIGS. 1 to 7, the respective segment 11*h* of the housing 11 of the rotary vane steering gear actuator 1 has a segment top face horizontal slit 50 on the segment top end face 11*k* so as to extend in the radial direction and to continuatively connect with the vertical segment slit 11*q*, and a segment top face horizontal seal 51 is held in the segment top face horizontal slit 50. A sealing face 51*a* of the segment top face horizontal seal 51 contacts the rear face 13*b* of the top cover 13.

Figure 6:
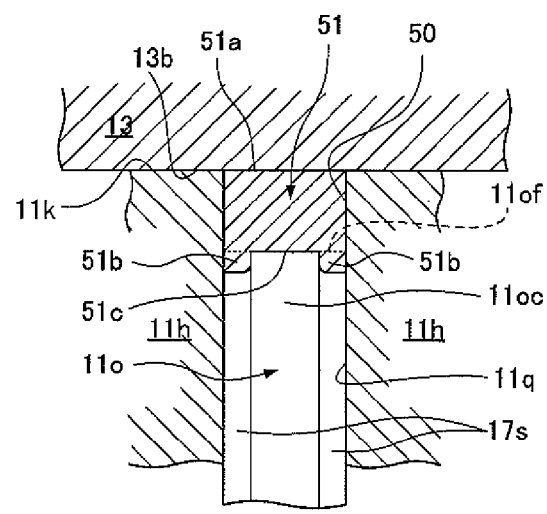
FIG. 6 shows a sectioned view seen along the arrows b-b in FIG. 5.
Figure 7:
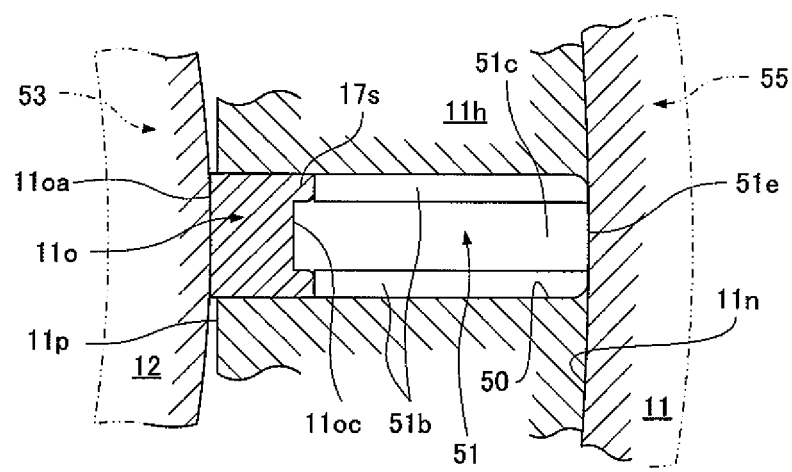
FIG. 7 shows a sectioned view seen along the arrows c-c in FIG. 5.

The segment top face horizontal seal 51 is made of elastic material such as polymer, etc., and, as shown in FIG. 6, holds the same cross sectional profile as that of the vertical segment seal 11*o*.

Thus, leakage of the working oil between the working oil chambers 15*a* and 15*b* (or between the working oil chambers 15*c* and 15*d*), that sit in direct neighborhood of the segment 11*h*, through the segment top end face 11*k* can be prevented by virtue of the contact of the sealing face 51*a* of the segment top face horizontal seal 51 with the rear face 13*b* of the top cover 13.

The connecting portion between the segment top face horizontal seal 51 and the upper end of the vertical segment seal 11*o* is as shown in FIGS. 3 to 7. Namely, lip portions 51*b* of the segment top face horizontal seal 51 are deleted at the connecting portion with the upper end of the vertical segment seal 11*o*, and the top end face 11*of* of the vertical segment seal 11*o* is inlaid into the said deleted portion.

By virtue of this configuration, space of the rear face 11*oc* of the vertical segment seal 11*o* and space of the rear face 51*c* of the segment top face horizontal seal 51 are communicatively connected each other in the state that the vertical segment seal 11*o* and the segment top face horizontal seal 51 are mounted in the vertical segment slit 11*q* and the segment top face horizontal slit 50, respectively.

In order to secure oil-tightness at the respective portions of an inner edge 51*d* and an outer edge 51*e* of the sealing face 51*a* of the segment top face horizontal seal 51, an upper ring seal 53 and an upper outer ring seal 55 are provided so as to contact the said inner edge 51*d* and the said outer edge 51*e*, respectively. Namely, an upper ring slit 52 of ring-shape is formed on the rear face 13*b* of the top cover 13 at the portion opposing to the outer circumferential edge portion of the upper end face of the rotor 12, and an upper ring seal 53 made of elastic material is held in the said ring slit 52.

The upper ring seal 53 holds similar constitution and performs similar function to the aforementioned upper ring seal 13*d*. Namely, the upper ring seal 53 is opposed to the outer circumferential edge portion of the upper end face of the rotor 12, and its ring sealing face 53*a* slidingly contacts the upper end face of the rotor 12. Furthermore, the ring sealing face outer edge 53*b* of the ring sealing face 53*a* contacts the sealing face inner edge 12*gb* of the upper horizontal vane seal 12*g* of the respective rotor vane 12*d*, and also contacts the sealing face inner edge 51*d* of the sealing face 51*a* of the segment top face horizontal seal 51.

In addition, an upper outer ring slit 54 of ring-shape is formed on the rear face 13*b* of the top cover 13 at the portion opposing to the inner circumferential edge portion of the top end face 11*b* of the housing 11, and an upper outer ring seal 55 made of elastic material is held in the said ring slit 54. And that, the ring sealing face 55*a* of the upper outer ring seal 55 contacts the inner circumferential edge portion of the top end face 11*b* of the housing 11, and prevents the high pressure working oil from leaking out to the outside through this portion. Furthermore, the sealing face outer edge 51*e* of the sealing face 51*a* of the segment top face horizontal seal 51 contacts the ring sealing face inner edge 55*b* of the ring sealing face 55*a* of the upper outer ring seal 55, and oil-tightness of this portion is secured.

The abovementioned seals the segment top face horizontal seal 51 provided on the top face of the respective segments 11*h*, and the upper ring seal 53 and the upper outer ring seal 55 provided on the rear face 13*b* of the top cover 13, respectively, are applied with the working pressure oil led from the working oil chambers 15*a*,15*c* (or 15*b*, 15*d*) that become high pressure side to the respective rear faces 51*c*, 53*c*, 55*c* of the respective seals 51, 53, 55 in order to strengthen sealing effect at the faces contacting with the respective mate contacting face, and at the edges contacting with the respective mate edge, and thus, the sealing face 51*a*, the ring sealing faces 53*a*, 55*a* and the ring sealing face edges 53*b*, 55*b* are pushed against the mate faces and the mate edges, respectively, by virtue of application of the hydraulic pressure.

It is by the following means to introduce the working pressure oil of the working oil chambers 15*a*, 15*c* (or 15*b*, 15*d*) that become high pressure side to the respective rear faces 51*c*, 53*c*, 55*c* of the abovementioned seals the segment top face horizontal seal 51, the upper ring seal 53 and the upper outer ring seal 55.

Namely, the means of introducing the working pressure oil of the working oil chambers 15*a*, 15*c* (or 15*b*, 15*d*) that become high pressure side to the rear face 53*c* of the upper ring seal 53 is same as the means introducing the working pressure oil to the rear face 13*da* of the upper ring seal 13*d* as aforementioned.

Figure 2:
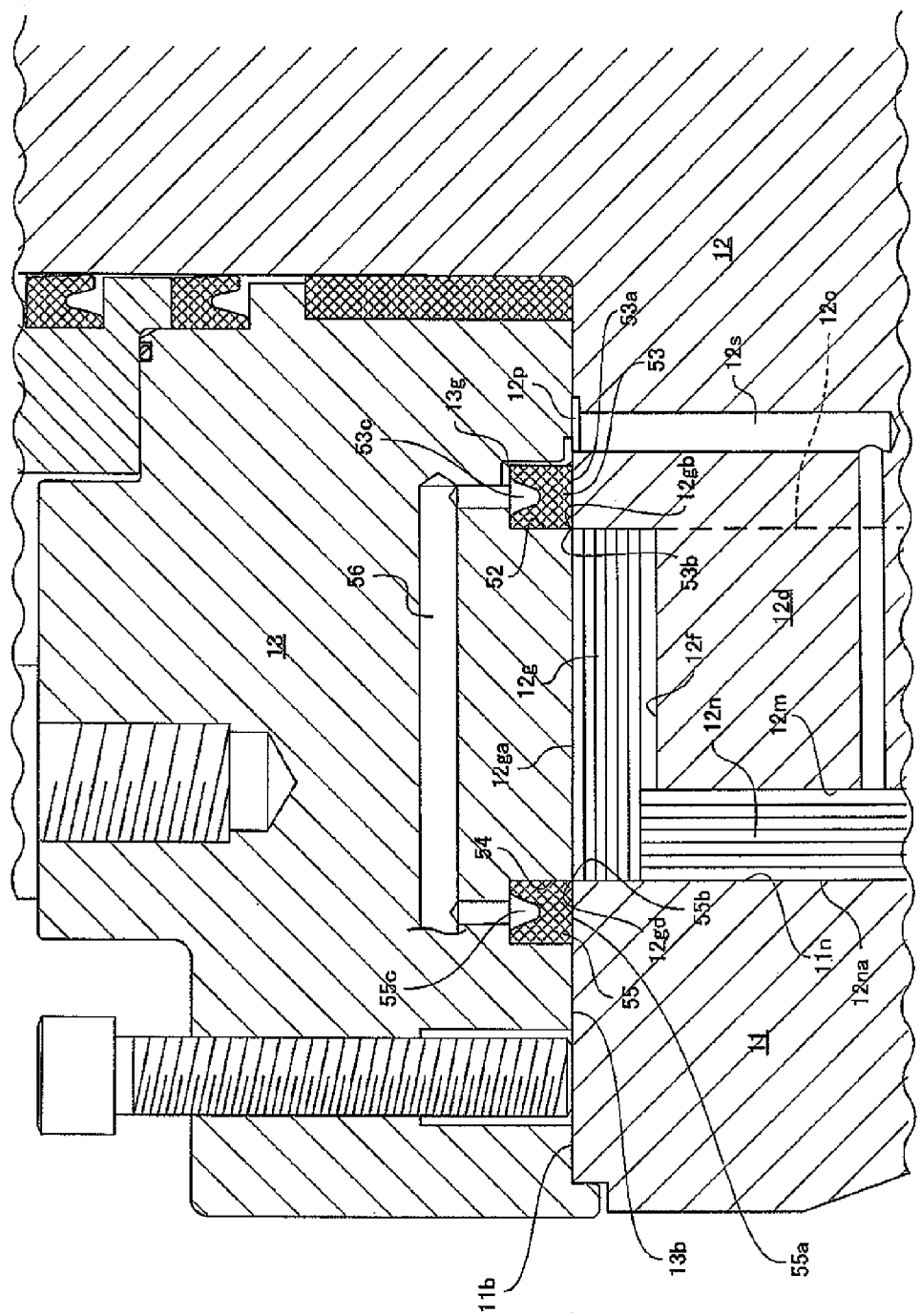
FIG. 2 shows an enlarged view of the Portion "A" in FIG. 1.
Figure 3:
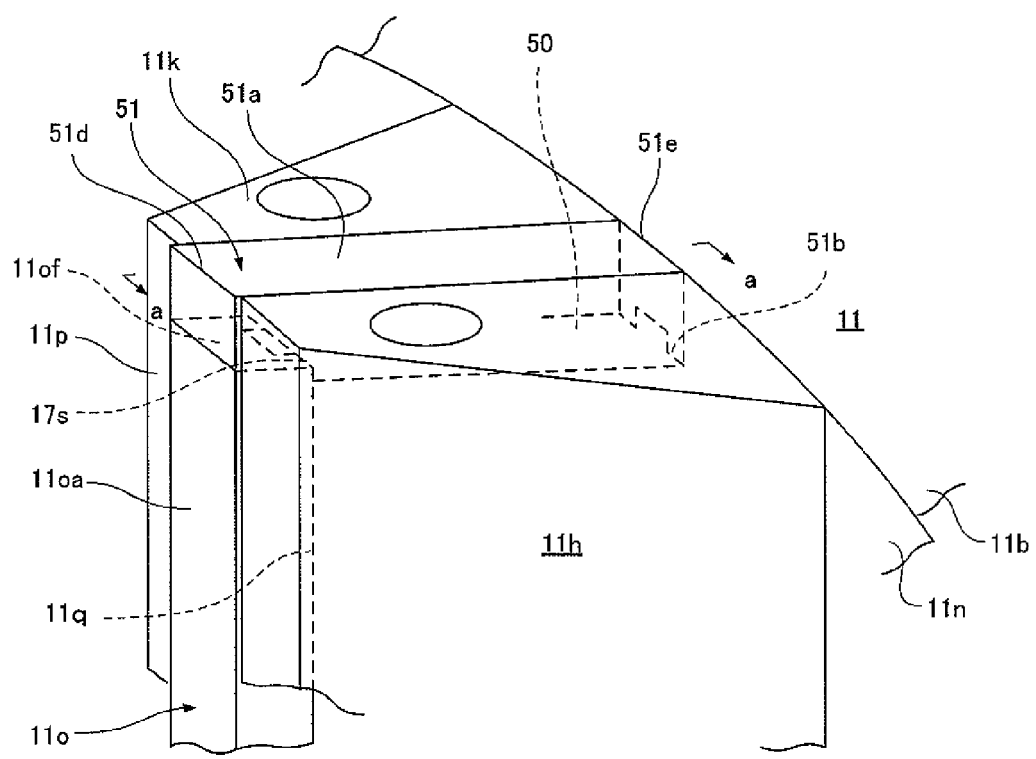
FIG. 3 shows a bird's-eye view of the Portion "B" in FIG. 1.
Figure 4A:
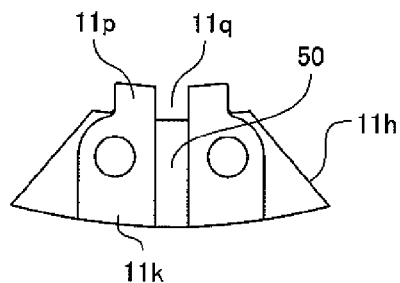
FIG. 4A shows a plane view of a housing segment.
Figure 4B:
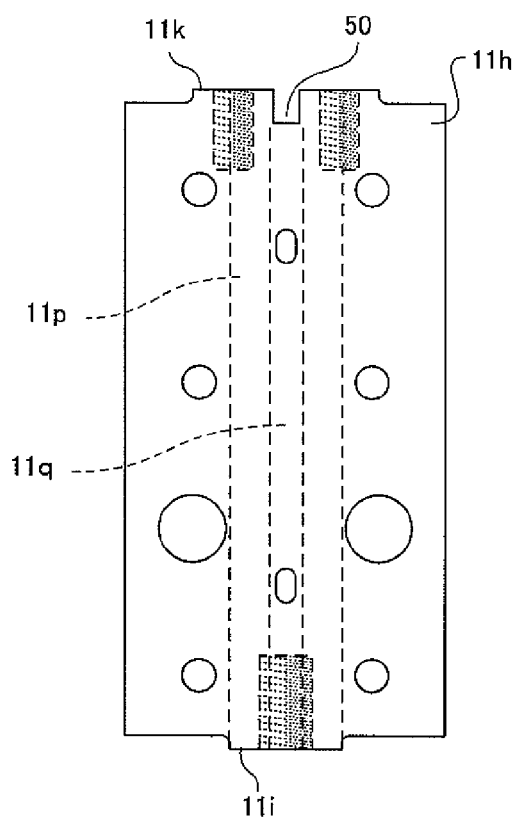
FIG. 4B shows a front view of a housing segment.
Figure 4D:
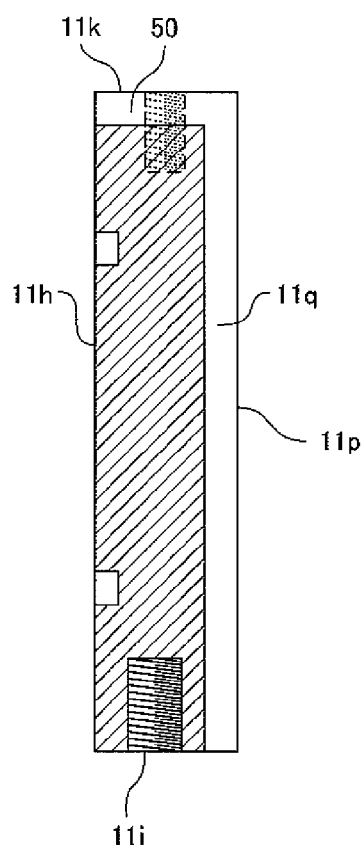
FIG. 4D shows a side view of a housing segment.
Figure 4C:
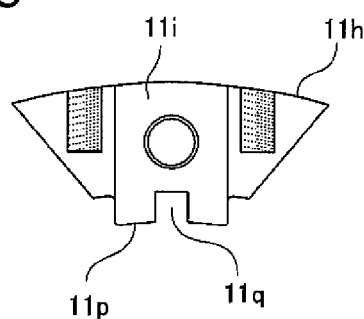
FIG. 4C shows a rear view of a housing segment.

That is, as shown in FIGS. 1 and 2, the working pressure oil extracted from the working oil chambers 15*a*, 15*c* (or 15*b*, 15*d*) that become high pressure side is introduced to the rotor upper face oil groove 12*p* through the oil passage 13*e* piercing the top cover 13, and then, introduced to the rear face 53*c* of the upper ring seal 53 through the oil groove 13*g* reaching the bottom of the upper ring slit 52 via its inner side face.

The means introducing the working pressure oil of the working oil chambers 15*a*, 15*c* (or 15*b*, 15*d*) that become high pressure side to the rear face 55*c* of the upper outer ring seal 55 is such that, as shown in FIGS. 1 and 2, an oil passage 56 is provided in the body of the top cover 13 so as to communicatively connect the bottom of the upper outer ring slit 54 with the bottom of the upper ring slit 52.

A means for applying the working pressure oil to the segment top face horizontal seal 51 is such that, as shown in FIG. 1, an oil passage 11*w* is provided in the boss portion 11*d* of the bottom of the housing 11 so as to communicatively connect the rear face 11*sa* of the lower ring seal 11*s* with the lower end portion 11*ob* of the rear face 11*oc* of the vertical segment seal 11*o*, and such a measure is taken that the working pressure oil extracted from the working oil chambers 15*a*, 15*c* (or 15*b*, 15*d*) that become high pressure side, and applied to the rear face 11*sa* of the lower ring seal 11*s* is also applied at the same time to the rear face 11*oc* of the vertical segment seal 11*o* and the rear face 51*c* of the segment top face horizontal seal 51.

Hereinafter explained are function and effect of the abovementioned constitution. When hydraulic pressure is generated in either working oil chambers 15*a*, 15*c* or working oil chambers 15*b*,15*d* in the working oil chambers 15*a*-15*d* of the rotary vane steering gear actuator 1, the top cover 13, suffering the hydraulic pressure on its rear face 13*b*, behaves itself like a ring-shaped cantilever, with the portions of the top cover fitting bolts 11*c*, that fixate the circumferential edge portion of the top cover 13 to the top end face 11*b* of the housing 11, being as fulcrums, and is subjected to deformation in such a manner that the inner circumferential side of the top cover 13 is necessarily brought upward, corresponding to magnitude of the hydraulic pressure. As a result, a clearance is created between the segment top end face 11*k* of the housing segment 11*h* and the rear face 13*b* of the top cover 13.

On the other hand, the hydraulic pressure generated in the working oil chambers 15*a*, 15*c* (or 15*b*, 15*d*) enters, as shown in FIG. 1, into the rotor upper face oil groove 12*p* on the upper end face of the rotor 12 through the oil passage 13*e* piercing the top cover 13, and furthermore, enters into the rotor lower face oil groove 12*q* on the lower end face of the rotor 12 through the balancing hole 12*r* of the rotor 12.

And then, the working pressure oil led to the rotor lower face oil groove 12*q* functions on the inner side wall and the rear face 11*sa* of the lower ring seal 11*s* through the oil groove 11*t*, and furthermore, functions on the rear face 11*oc* of the respective vertical segment seal 11*o* through the oil passage 11*w* so that it pushes the sealing face 11*oa* of the vertical segment seal 11*o* against the outer circumferential face 120 of the rotor 12 for securing a sealing function at this portion.

At the same time, this hydraulic pressure functions on the rear face 51*c* of the respective segment top face horizontal seal 51 through the lower end portion 11*ob* of the rear face 11*oc* of the respective vertical segment seal 11*o* so that it pushes upwards the segment top face horizontal seal 51 as much as compensating the abovementioned clearance generated between the segment top end face 11*k* of the housing segment 11*h* and the rear face 13*b* of the top cover 13, and pushes the sealing face 51*a* of the segment top face horizontal seal 51 against the rear face 13*b* of the top cover 13.

On the one hand, the working pressure oil led to the rotor upper face oil groove 12*p* functions, as shown in FIG. 2, on the oil groove 13*g* provided on the inner side face of the upper ring slit 52, and pushes the outer circumferential side face of the upper ring seal 53 against the outer circumferential side face of the upper ring slit 52. By virtue of this, it is prevented that the working oil of the working oil chambers 15*a*, 15*c* (or 15*b*, 15*d*) of high pressure side leaks into the working oil chambers 15*b*, 15*d* (or 15*a*,15*c*) of low pressure side through the said side face.

Figure 5:
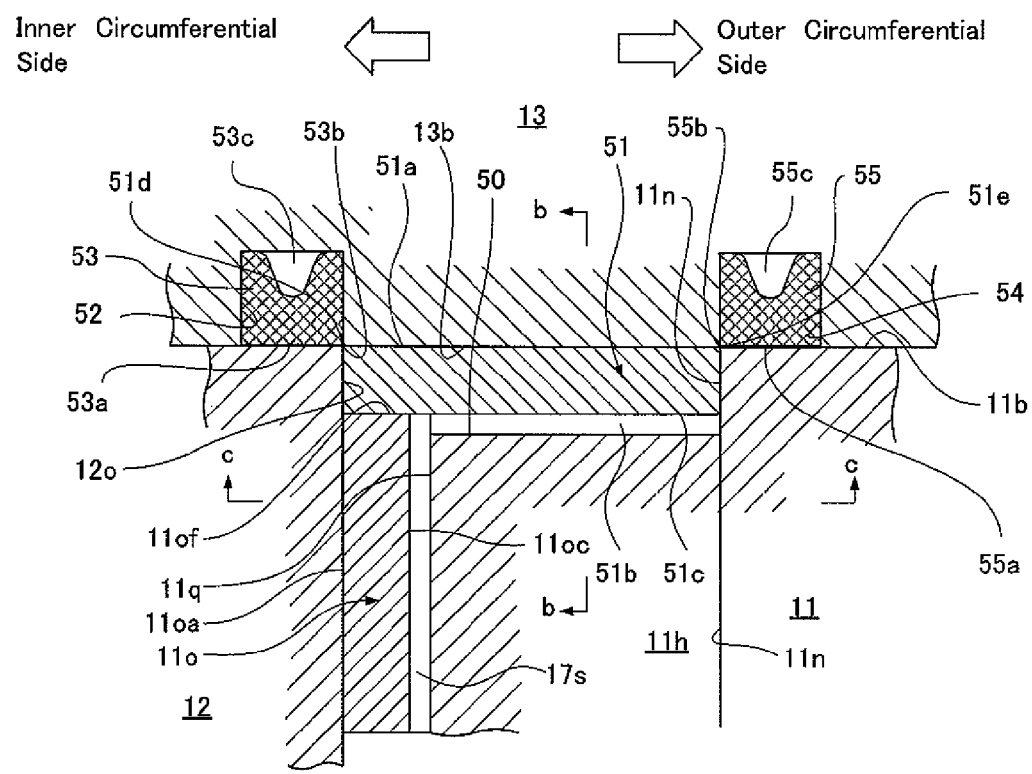
FIG. 5 shows a vertically sectioned front view of the Portion "A" in FIG. 1, and a sectioned view seen along the arrows a-a in FIG. 3.

The working oil of high pressure led to the oil groove 13*g* provided on the inner side face of the upper ring slit 52 further functions on the rear face 53*e* of the upper ring seal 53, too, and pushes its ring sealing face 53*a* against the outer circumferential edge portion of the upper end face of the rotor 12, and at the same time, as shown in FIGS. 2 and 5, pushes the ring sealing face outer edge 53*b* of the ring sealing face 53*a* of the upper ring seal 53 against the sealing face inner edge 12*gb* of the sealing face 12*ga* of the upper horizontal vane seal 12*g*, and the sealing face inner edge 51*d* of the sealing face 51*a* of the segment top face horizontal seal 51, respectively. By virtue of this, it is prevented that the working oil of the working oil chambers 15*a*, 15*c* (or 15*b*, 15*d*) of high pressure side leaks into the working oil chambers 15*b*, 15*d* (or 15*a*, 15*c*) of low pressure side through the said ring sealing face 53*a*, and through the said respective edge portions 53*b*,12*gb*, and 53*b*, 51*d*.

The said working pressure oil from the working oil chambers 15*a*, 15*c* (or 15*b*, 15*d*) that become high pressure side functions, as shown in FIG. 2, on the rear face 55*c* of the upper outer ring seal 55 via the rear face 53*c* of the upper ring seal 53 through the oil passage 56 provided in the body of the top cover 13. By virtue of this, the ring sealing face 55*a* of the upper outer ring seal 55 is pushed against the inner circumferential edge portion of the housing top end face 11*b*, and it is prevented that the high pressure working oil leaks out to the outside through this portion. And that, at the same time, the working pressure oil led to the rear face 55*c* of the upper outer ring seal 55 pushes the ring sealing face inner edge 55*b* of the ring sealing face 55*a* of the upper outer ring seal 55, as shown in FIGS. 2 and 5, against the sealing face outer edge 12*gd* of the sealing face 12*ga* of the upper horizontal vane seal 12*g*, and against the sealing face outer edge 51*e* of the sealing face 51*a* of the segment top face horizontal seal 51, respectively. By virtue of this, it is prevented that the working pressure oil of the working oil chambers 15*a*, 15*c* (or 15*b*, 15*d*) of high pressure side leaks into the working oil chambers 15*b*, 15*d* (or 15*a*, 15*c*) of low pressure side through these respective edge portions 55*b*, 12*gb*, and 55*b*, 51*e*.

As the abovementioned respective contacts between the seals are secured by the force of the working oil pressure applied to the rear face of the respective seals, in spite of generation of a clearance aforementioned, oil-tightness of the respective contacts can be secured regardless of the said clearance.

Furthermore, while the higher the hydraulic pressure generated in the working oil chambers 15*a*, 15*c* (or 15*b*, 15*d*) becomes, and accordingly, the larger an amount of the abovementioned clearance becomes, the stronger the force of pushing the respective sealing faces 51a, 53a, 55a of the segment top face horizontal seal 51, the upper ring seal 53 and the upper outer ring seal 55 against the respective mate faces and mate edges becomes, at the same time. And hence, not only it is possible to follow the generation of the abovementioned clearance, but also oil-tightness of the contacting portions is strengthened.

In order to verify the effect of the mode for carrying out the present invention, tests have been carried out, using actual rotary vane steering gears. Hereinafter explained are the results of the tests.

FIG. 8 shows the results of having measured strains in the axial direction, when applying hydraulic pressure, generated at the respective radial points of the top cover 13 of the actuator 1 (that is, amounts of clearances generated between the rear face 13b of the top cover 13 and the respective segment top end face 11k of the segment 11h, the upper end face of the rotor 12 and the top end face 11b of the housing 11) with respect to the actual rotary vane steering gears of various models and various output torque.

For instance, the case where the largest strain in the axial direction has been observed has been such that strain (clearance) of 0.88 mm has been created at the portion of the central penetrating hole 13h of the top cover 13 in the model N-105 rotary vane steering gear (3-vane type) when applying test hydraulic pressure of 15 MPa. For other instance, in case of the smaller model N-30 rotary vane steering gear (2-vane type), strain (clearance) at the same portion as the abovementioned has been 0.47 mm under test hydraulic pressure of 15 MPa.

FIG. 9 shows the results of measuring time required by a steering gear for traveling rudder angles of 65 degrees, under various working oil pressure, using the abovementioned model N-30 rotary vane steering gear (2-vane type).

For the convenience of comparison, the test has been carried out with 3 versions; that is, Standard model (the one by prior art), Conversion 1 (the one, in which the mode for carrying out the present invention is applied to the Standard model, but the upper outer ring seal 55 is excluded), and Conversion 2 (the one, in which the upper outer ring seal 55 is added to the Conversion 1).

As shown in FIG. 9, the results by the Standard model has been such that the required time for traveling rudder angles of 65 degrees (that is, 65 degrees revolution of the rotor 12) has increased as the working oil pressure becomes high. Especially, at the pressure higher than about 11 MPa, it has become a sudden increase. At last, it has come to 118 sec. at the working oil pressure of about 11.5 MPa, and, at the higher pressure, the rotor 12 has not been revolved any more, and has come to a stalling state.

In other words, it means that, at the working oil pressure of about 11.5 MPa, the working oil delivered to the working oil chambers 15a, 15c (or 15b, 15d) of high pressure side from the oil pump 21 has wholly leaked into the working oil chambers 15b, 15d (or 15a, 15c) of low pressure side.

In the Conversion 1, when the working oil pressure is lower than about 11 MPa, the required time for traveling rudder angles of 65 degrees has been less than 28 sec that is the prescribed value by the Classification Societies, but, when the working oil pressure becomes higher than it, the required time for traveling rudder angles of 65 degrees (65 degrees revolution of the rotor 12) has exhibited a sudden increase. In other words, an amount of leakage of the working oil from the working oil chambers 15a, 15c (or 15b, 15d) of high pressure side into the working oil chambers 15b, 15d (or 15a, 15c) has so increased that such a state has been brought that it is hard for the working oil pressure to be more generated.

In contrast, in the Conversion 2, the required time for traveling rudder angles of 65 degrees (65 degrees revolution of the rotor 12) is little influenced by magnitude of the working oil pressure, and, the required time has come at length to be 28 sec, that is the prescribed value by the Classification Societies, when the working oil pressure has come to 17 MPa. In other words, such a result has been obtained that an amount of leakage of the working oil from the working oil chambers 15a, 15c (or 15b, 15d) of high pressure side into the working oil chambers 15b, 15d (or 15a, 15c) has little changed from that at no load condition, even when the working oil pressure becomes high, and thus, effectiveness of the mode for carrying out the present invention has been confirmed.

From the abovementioned matters, the rotary vane steering gears of the mode for carrying out the present invention exhibits such effectiveness that it is possible to heighten working oil pressure even to 160 kg/cm$^2$ or higher, and furthermore, it becomes unnecessary to increase quantity of oil pump discharge in anticipation of an amount of leakage of the working pressure oil through the portion of the said clearance, while a rotary vane steering gear of a prior art has been forced to be restrained of magnitude of the working oil pressure to about 80 kg/cm$^2$ maximum, and that it has been necessary for an oil pump to discharge larger quantity in anticipation of an amount of leakage of the working pressure oil through the portion of the said clearance.

Furthermore, it becomes possible for the top cover 13 to be used of material of low Young's Modulus such as steel plate welding construction, etc. Since the influence of the abovementioned clearance becomes ineffective. Furthermore, durability of a steering gear is raised by virtue that endurability to the creeping phenomenon in steering gear operation is raised.

In the next place, the other mode for carrying out the present invention for coping with further high pressurization of the working oil pressure of a rotary vane steering gear actuator 1 is explained on the basis of FIGS. 10 to 13. This other mode for carrying out the present invention is such one that the above-explained mode for carrying out the present invention is applied just as it is, and other constitution is added to it. Accordingly, only the added portions and the portions that become necessary to be altered in conjunction with the said addition are explained in the following.

As shown in FIGS. 10 to 13, the respective segment 11h of the housing 11 of the rotary vane steering gear actuator 1 has a segment bottom face horizontal slit 57 on the segment bottom end face 11i so as to extend in the radial direction and to continuatively connect with the vertical segment slit 11q, and a segment bottom face horizontal seal 58 is held in the segment bottom face horizontal slit 57. A sealing face 58a of the segment bottom face horizontal seal 58 contacts the internal base 11f of the housing 11.

Figure 12:
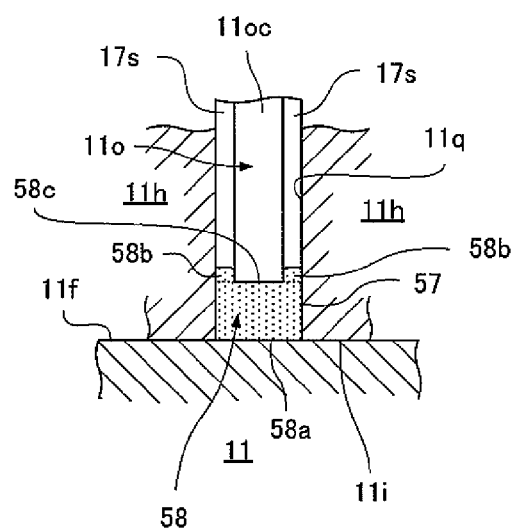
FIG. 12 shows a sectioned view seen along the arrows d-d in FIG. 11.
Figure 13:
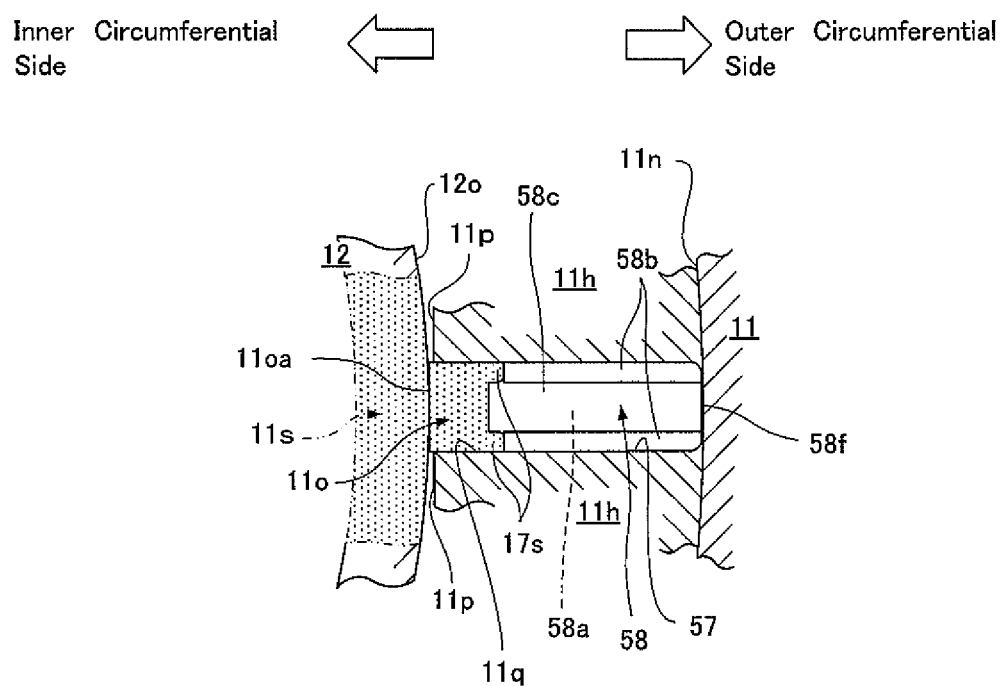
FIG. 13 shows a sectioned view seen along the arrows e-e in FIG. 11.
Figure 14:
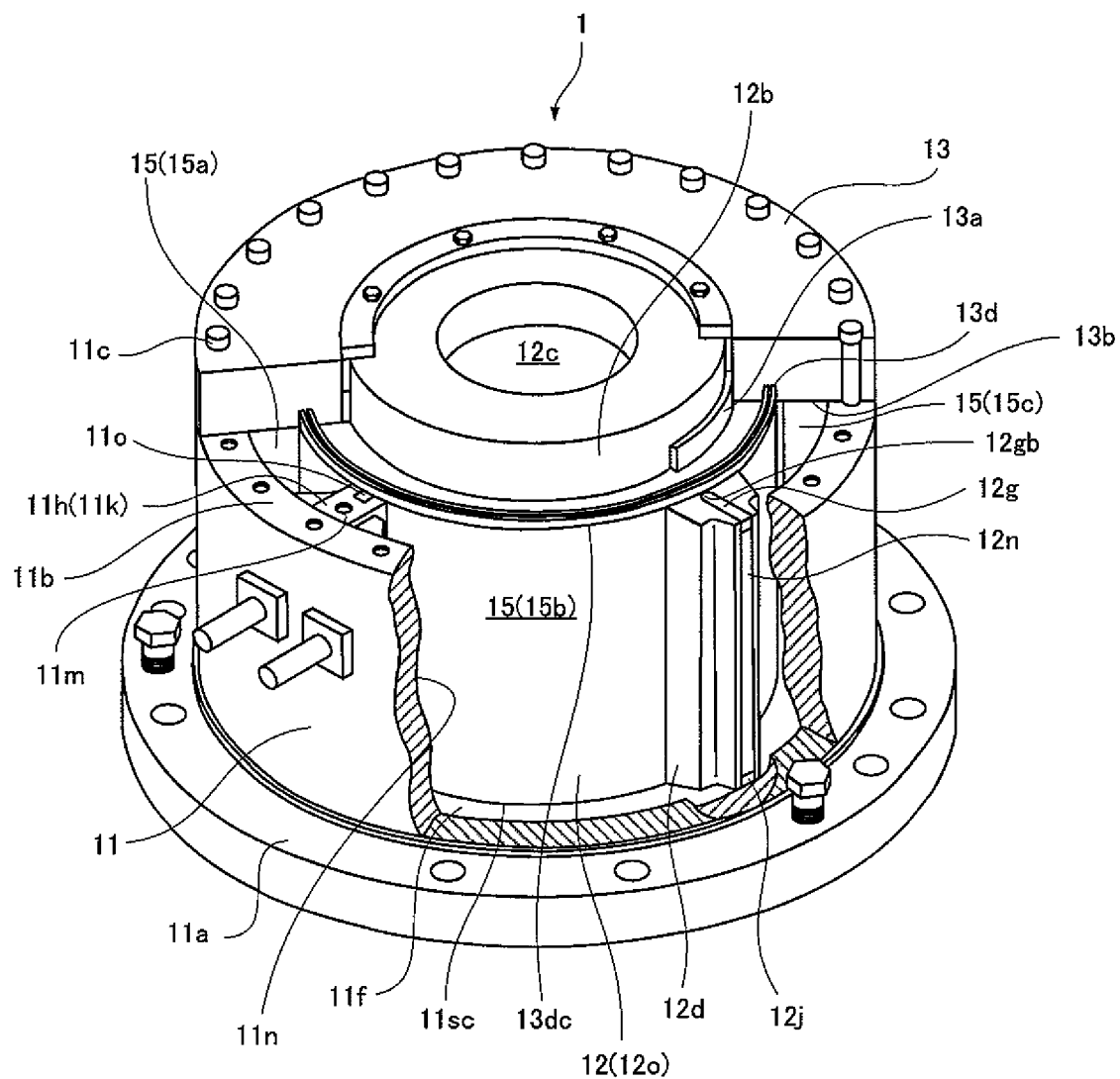
FIG. 14 shows a partially sectioned bird's-eye view of a rotary vane steering gear actuator of a prior art.
Figure 15:
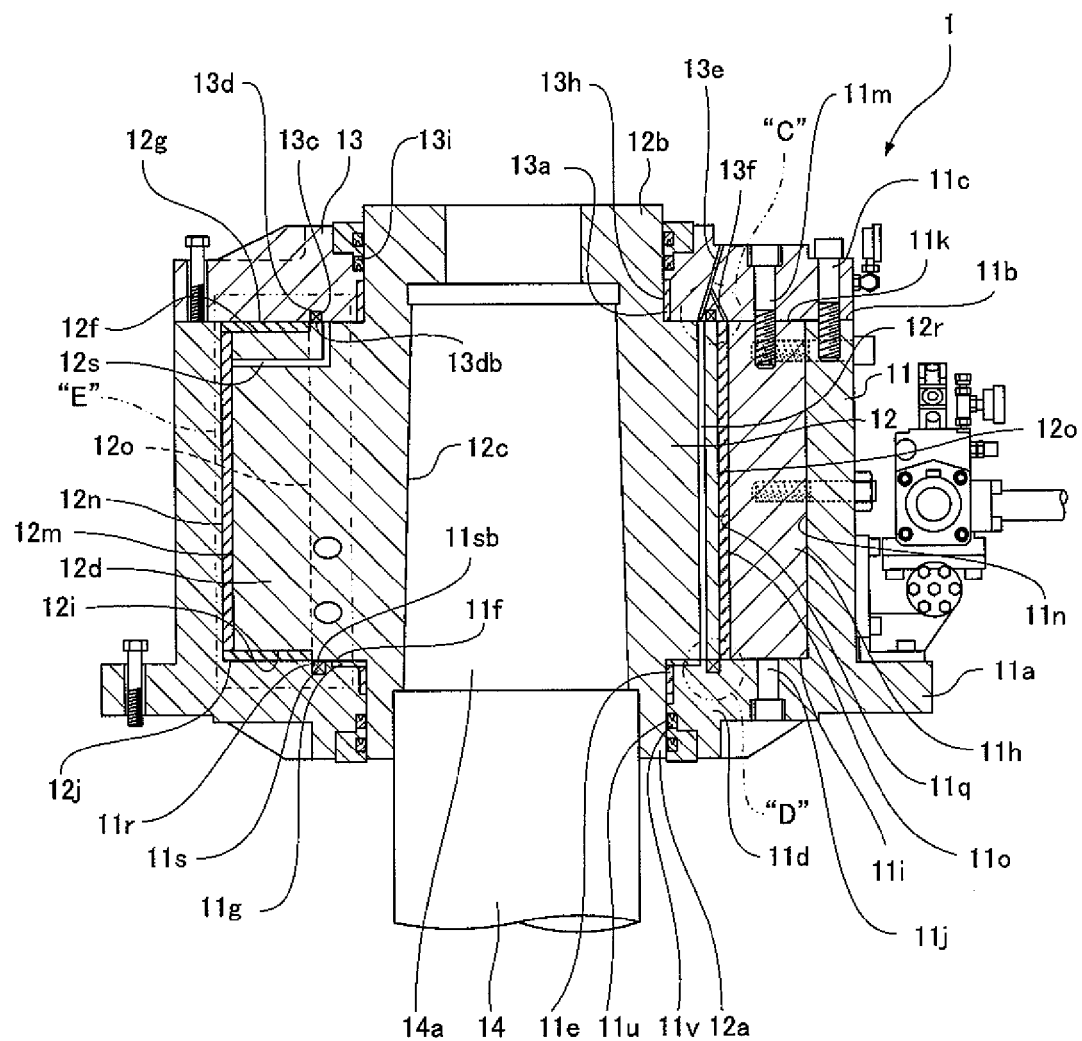
FIG. 15 shows a vertically sectioned front view of the same rotary vane steering gear actuator, seen along the arrows f-f in FIG. 16.
Figure 16:
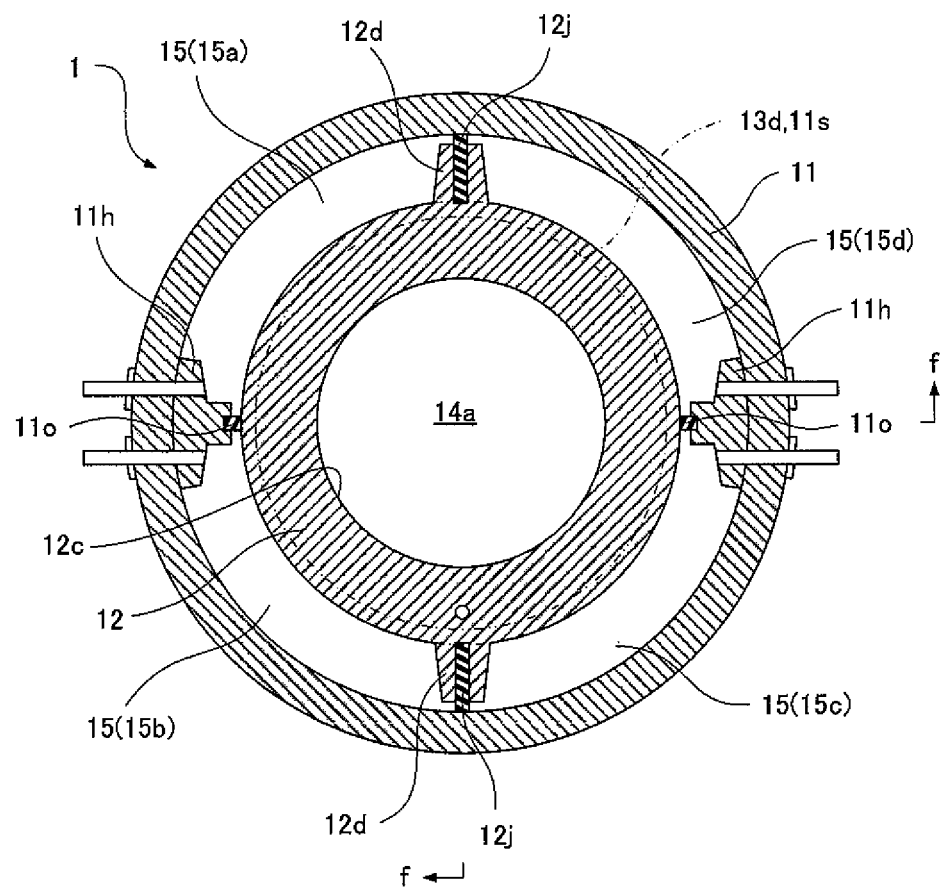
FIG. 16 shows a horizontally sectioned plane view of the same rotary vane steering gear actuator.
Figure 17:
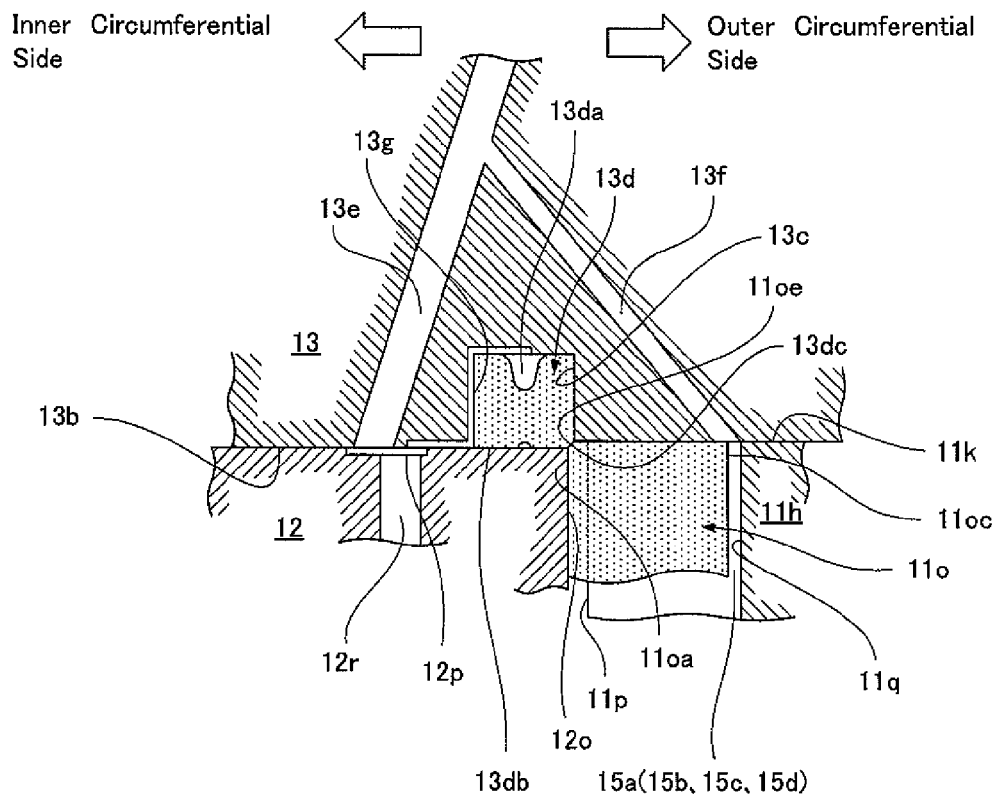
FIG. 17 shows an enlarged view of the Portion "C" in FIG. 15.
Figure 18:
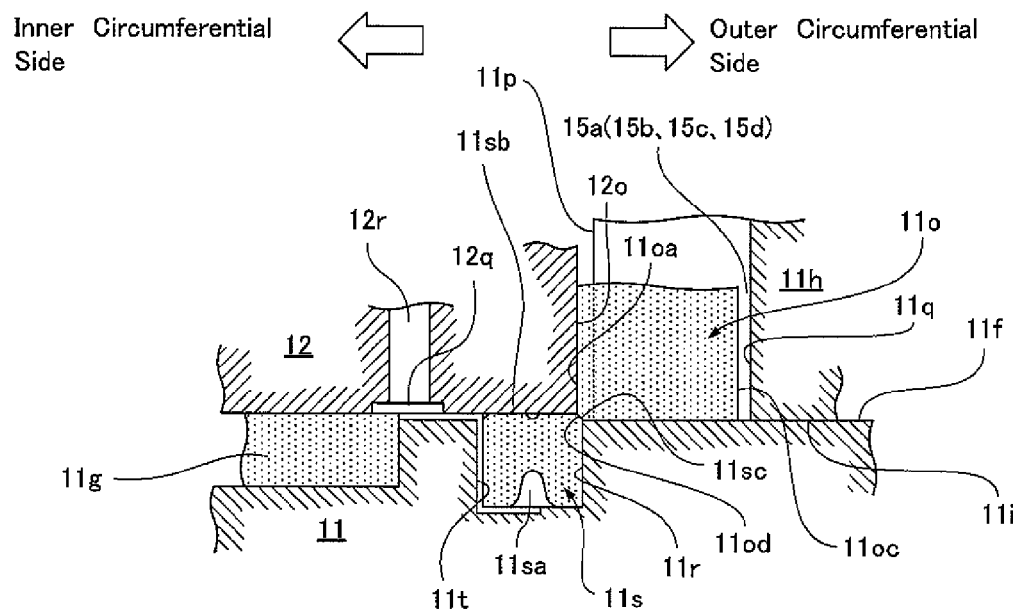
FIG. 18 shows an enlarged view of the Portion "D" in FIG. 15.
Figure 19:
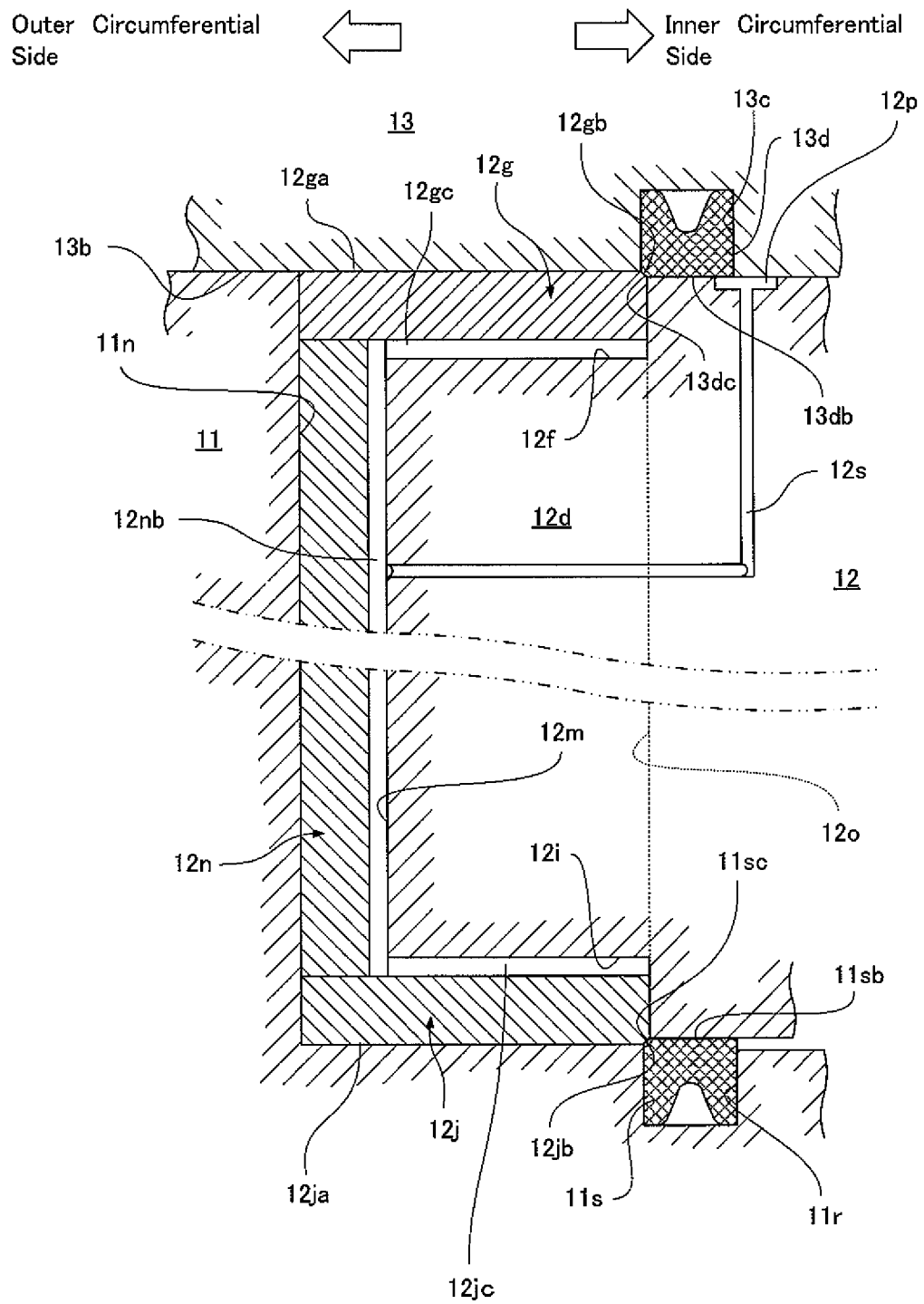
FIG. 19 shows an enlarged view of the Portion "E" in FIG. 15.
Figure 20:
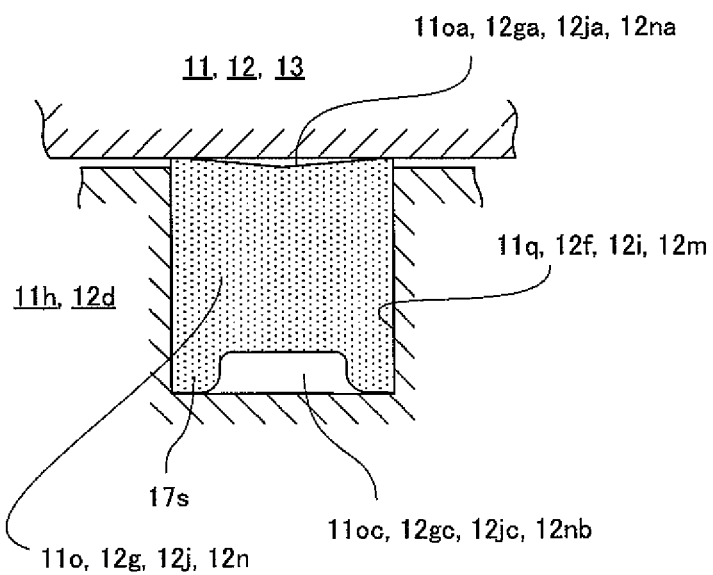
FIG. 20 shows a cross sectioned view of linear seals of the same rotary vane steering gear actuator.
Figure 21:
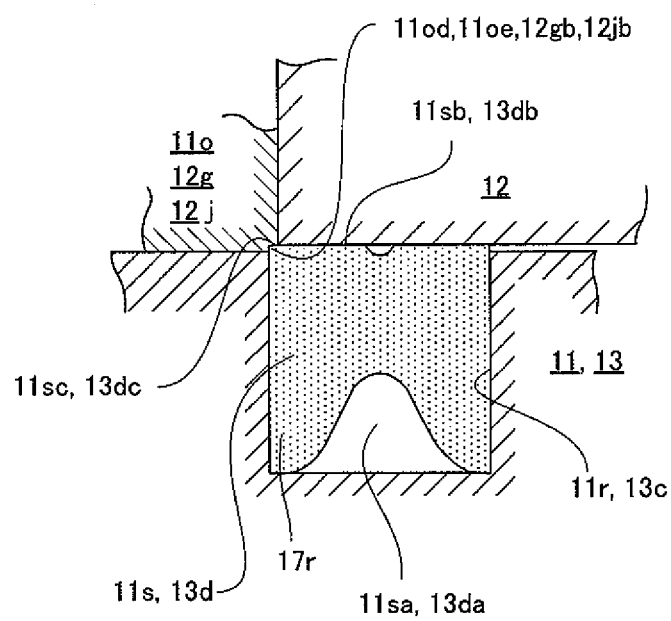
FIG. 21 shows a cross sectioned view of ring seals of the same rotary vane steering gear actuator.
Figure 22:
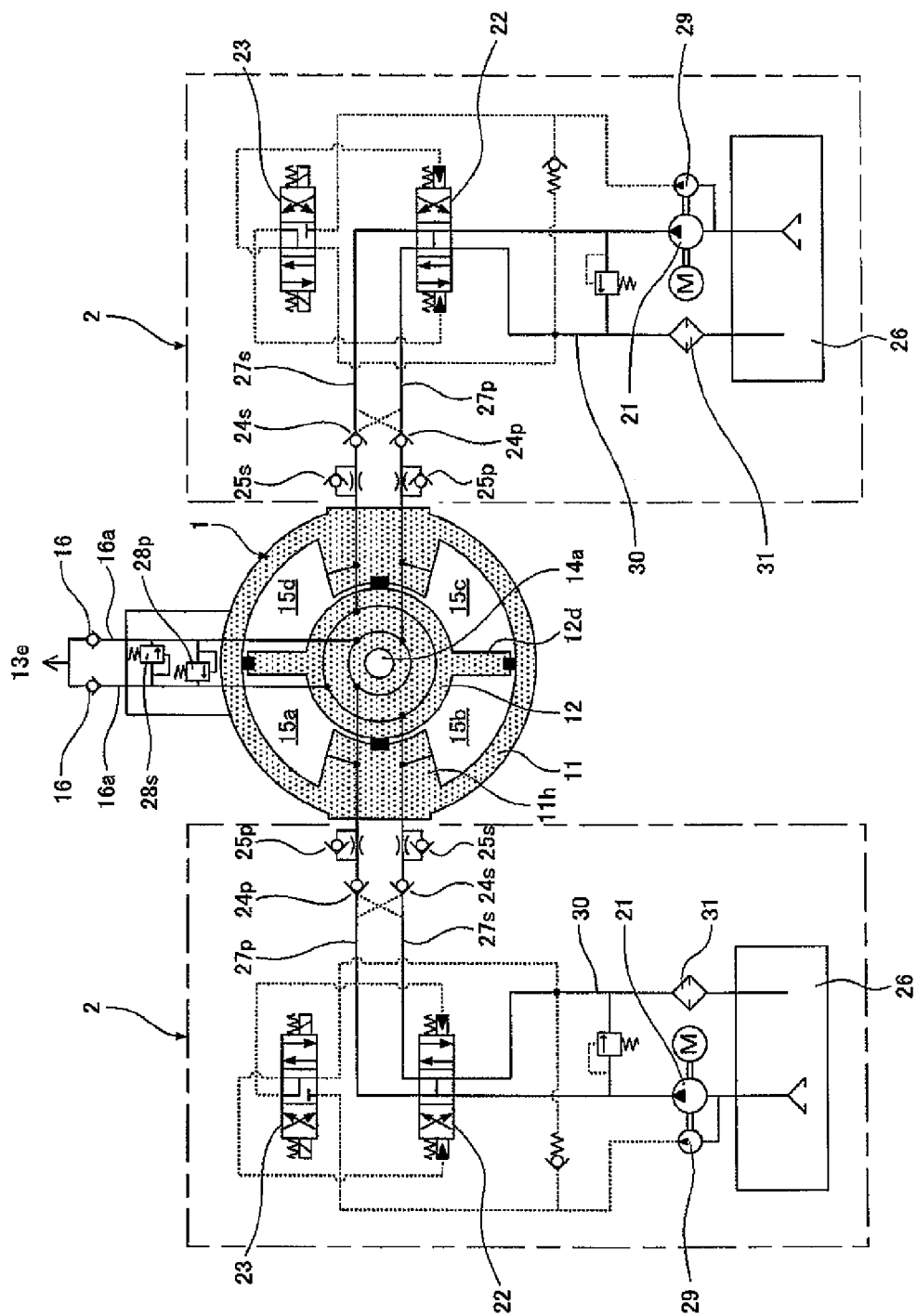
FIG. 22 shows a hydraulic system diagram of a rotary vane steering gear of a prior art.

The segment bottom face horizontal seal 58 is made of elastic material such as polymer, etc., and, as shown in FIGS. 12 and 13, holds the same cross sectional profile as that of the vertical segment seal 11o. Thus, leakage of the working oil between the working oil chambers 15a and 15b (or between the working oil chambers 15c and 15d), that sit in direct neighborhood of the segment 11h, through the segment bottom end face 11i can be prevented by virtue of the contact of the sealing face 58a of the segment bottom face horizontal seal 58 with the internal base 11f of the housing 11.

The connecting portion between the segment bottom face horizontal seal 58 and the lower end of the vertical segment seal 11o is of the similar constitution to the connecting portion between the segment top face horizontal seal 51 and the upper end of the vertical segment seal 11o.

Figure 11:
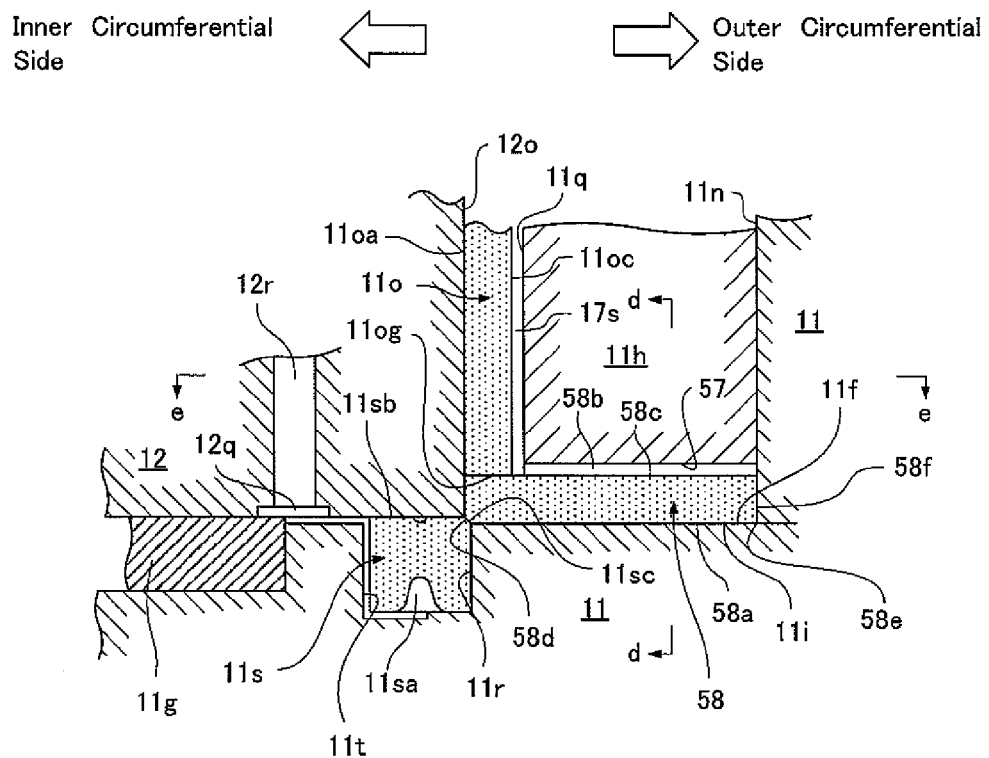
FIG. 11 shows an enlarged vertically sectioned front view of the Portion "C" in FIG. 10.

Namely, as shown in FIG. 11, lip portions 58b of the segment bottom face horizontal seal 58 are deleted at the connecting portion with the lower end of the vertical segment seal 11o, and the bottom end face 11og of the vertical segment seal 11o is inlaid into the said deleted portion.

By virtue of this configuration, space of the rear face 11oc of the vertical segment seal 11o and space of the rear face 58c of the segment bottom face horizontal seal 58 are communicatively connected each other in the state that the vertical segment seal 11o and the segment bottom face horizontal seal 58 are mounted in the vertical segment slit 11q and the segment bottom face horizontal slit 57, respectively.

The sealing face inner edge 58d of the sealing face 58a of the segment bottom face horizontal seal 58 contacts the sealing face outer edge 11sc of the sealing face 11sb of the lower ring seal 11s, and by virtue of this, oil-tightness at the portion of the sealing face inner edge 58d of the sealing face 58a of the segment bottom face horizontal seal 58 is secured.

Furthermore, with respect to the portion of the sealing face outer edge 58e of the sealing face 58a of the segment bottom face horizontal seal 58, oil-tightness at this portion can be secured by virtue that an outer end face 58f of the segment bottom face horizontal seal 58 contacts the inner circumferential face 11n of the housing 11.

In order to strengthen sealing effect at the respective contacting portions between the sealing face 58a of the segment bottom face horizontal seal 58 and the internal base 11f of the housing 11 that is the contacting face with the said sealing face 58a, and between the sealing face inner edge 58d of the said sealing face 58a and the sealing face outer edge 11sc of the sealing face 11sb of the lower ring seal 11s that is the contacting edge with the said sealing face inner edge 58d, the working pressure oil is led to the rear face 58c of the segment bottom face horizontal seal 58 from the working oil chambers 15a, 15c (or 15b, 15d) that become high pressure side, and, by virtue of this hydraulic pressure, the said sealing face 58a and the said sealing face inner edge 58d are pushed against the mate face and the mate edge, respectively.

It is by the following means to introduce the abovementioned high pressure working oil to the rear face 58c of the segment bottom face horizontal seal 58.

Figure 10:
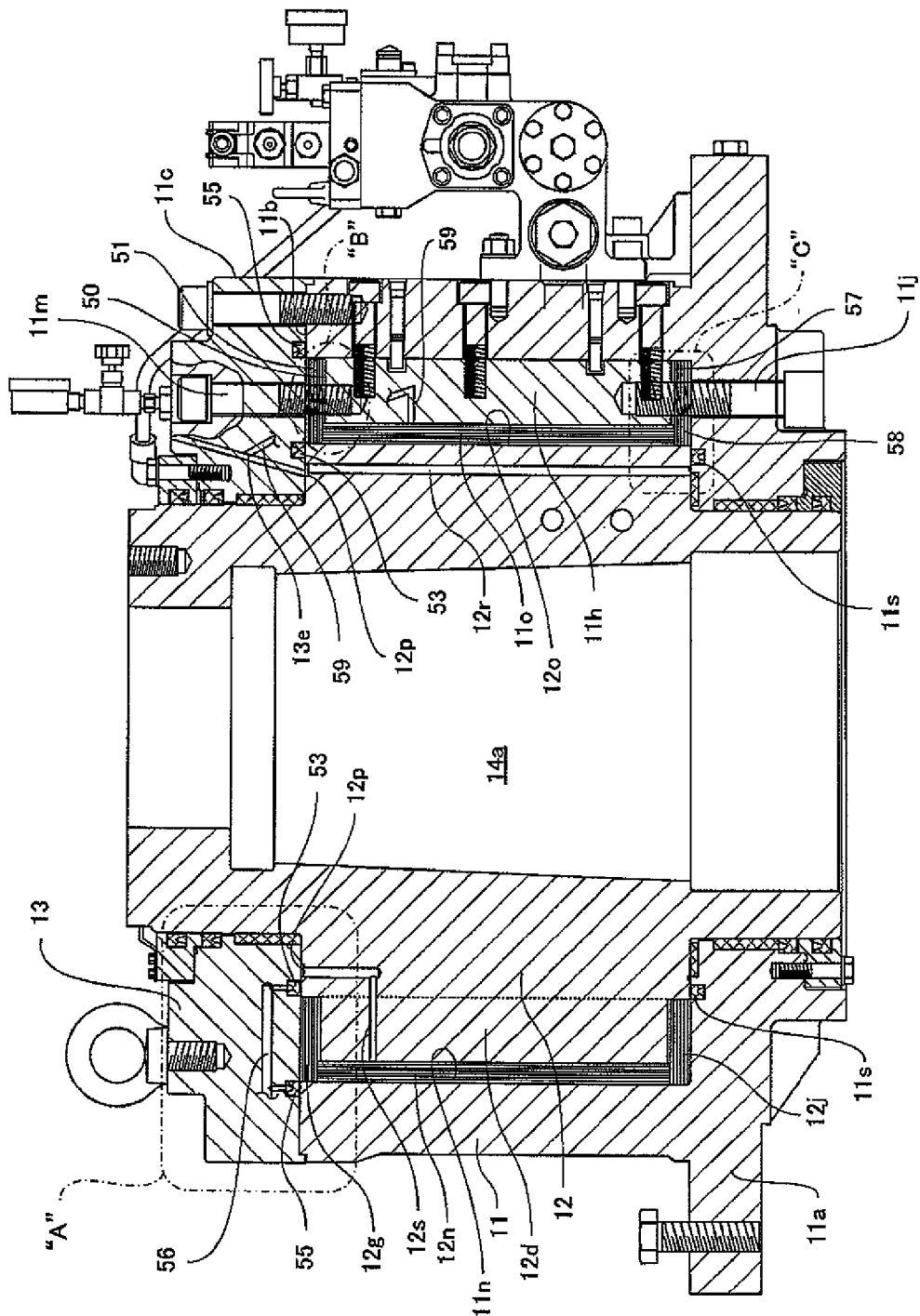
FIG. 10 shows a vertically sectioned front view of a rotary vane steering gear actuator in accordance with other mode for carrying out the present invention.

Namely, the working pressure oil extracted from the working oil chambers 15a, 15c (or 15b, 15d) that become high pressure side is led to the oil passage 13e piercing the top cover 13, as explained in the aforementioned mode for carrying out the present invention, and then, as shown in FIG. 10 is led to an oil passage 59 provided so as to diverge from the oil passage 13e, and open to the rear face 11oc of the vertical segment seal 11o, passing through the inside of body of the segment 11h.

Thus, the working pressure oil led to the rear face 11oc of the vertical segment seal 11o functions on the said rear face 11oc of the vertical segment seal 110, and at the same time, also functions on the rear face 58c of the segment bottom face horizontal seal 58 because of the aforementioned communicative connection between the space of the rear face 11oc of the vertical segment seal 11o and the space of the rear face 58c of the segment bottom face horizontal seal 58.

In this connection, the working pressure oil led to the rear face 11oc of the vertical segment seal 11o also functions on the rear face 51c of the segment top face horizontal seal 51, as explained in the aforementioned mode for carrying out the present invention.

Hereinafter explained are function and effect of the abovementioned constitution.

When hydraulic pressure is generated in either working oil chambers 15a, 15c or working oil chambers 15b, 15d in the working oil chambers 15a-15d of the rotary vane steering gear actuator 1, the top cover 13, suffering the hydraulic pressure, behaves itself like a ring-shaped cantilever, with the portions of the top cover fitting bolts 11c, that fixate the circumferential edge portion of the top cover 13 to the top end face 11b of the housing 11, being as fulcrums, and the inner circumferential side of the top cover 13 is necessarily brought upward, corresponding to magnitude of the hydraulic pressure.

Leakage of the working oil from the working oil chambers 15a, 15c (or 15b, 15d) that become high pressure side into the working oil chambers 15b, 15d (or 15a, 15c) of low pressure side through a clearance created by the hydraulic pressure between the segment top end face 11k of the housing segment 11h and the rear face 13b of the top cover 13 is prevented, as explained in the aforementioned mode for carrying out the present invention, by the functions of the segment top face horizontal seal 51, the upper ring seal 53 and the upper outer ring seal 55.

On the other hand, when the inner circumferential side of the top cover 13 is deformed upward by the hydraulic pressure generated in the working oil chambers 15a-15d, with the top cover 13 behaving itself like a ring-shaped cantilever, also the housing segment 11h develops a tendency to be transferred so as to be lifted upward, through the bolt 11m at the segment top end face 11k, and against tensile strength of the bolt 11j at the segment bottom end face 11k. And, in case of further high pressurization, such a clearance may be generated between the bottom end face 11i of the segment 11h and the internal base 11f of the housing 11 as to be harmful for leakage of the working oil from the working oil chambers 15a, 15c (or 15b, 15d) of high pressure side into the working oil chambers 15b, 15d (or 15a, 15c) of low pressure side.

On one hand, the working pressure oil in the working oil chambers 15a, 15c (or 15b, 15d) that become high pressure side functions on the vertical segment seal 11o, as shown in FIG. 10, passing through the passage 59 that diverges from the oil passage 13e, piercing the top cover 13.

At the same time, this working pressure oil is led to the space of the rear face 58c of the segment bottom face horizontal seal 58 that communicatively connects with the space of the rear face 11oc of the vertical segment seal 11o.

And then, this hydraulic pressure pushes down the segment bottom face horizontal seal 58 as much as compensating the clearance generated between the segment bottom end face 11i of the segment 11h and the internal base 11f of the housing 11, and pushes its sealing face 58a against the internal base 11f of the housing 11, and at the same time, pushes its sealing face inner edge 58d of the sealing face 58a against the sealing face outer edge 11sc of the face 11sb of the lower ring seal 11s.

Thus, even if the hydraulic pressure generated in the working oil chambers 15a to 15d is high, and hereby a harmful clearance is generated between the segment bottom end face 11i of the segment 11h and the internal base 11f of the housing 11, the segment bottom face horizontal seal 58 can follow this clearance, thanks to the working oil pressure that functions on its rear face 58c. By virtue of this, it can be prevented that the working oil in the working oil chambers 15a, 15c (or 15b,15d) of high pressure side leaks into the working oil chambers 15b, 15d (or 15a, 15c) of low pressure side through the portion of the segment bottom end face 11i of the segment 11h.

And that, the higher the hydraulic pressure in the working oil chambers 15a-15d becomes, the larger an amount of the said clearance becomes, but at the same time, surface pressure at the sealing face 58a and the sealing face inner edge 58d of the segment bottom face horizontal seal 58 becomes high, and hence, oil-tightness at the portion of the segment bottom end face 11i of the segment 11h is strengthened. Thus, this mode for carrying out the present invention can cope with further high pressurization of the working oil pressure.

Having described the invention, the following is claimed:

1. A working oil chamber sealing system of a rotary vane steering gear actuator, said actuator comprising:
    a rotor into which a rudderstock is fitted,
    a housing that accommodates the rotor and forms space for working oil chambers in circumferences of the rotor, and
    a ring-shaped top cover arranged at an upper opening of the housing, with its circumferential edge portion being fixated to a housing top face circumferential edge portion by bolts, extending over a whole circumference,
    wherein:
    the rotor has plural vanes arranged protrusively on an outer periphery at equal intervals along a circumferential direction,
    the housing has plural segments arranged protrusively on an inner periphery at equal intervals along the circumferential direction,
    the space for working oil chambers is divided into plural working oil chambers by vanes and the segments,
    the top cover has a ring-shaped upper ring slit on a rear face of the top cover at a portion opposing to an outer circumferential edge of an upper end face of the rotor, and an upper ring seal that touches the upper end face of the rotor is held in the upper ring slit,
    the housing has a ring-shaped lower ring slit on an internal base of the housing at a portion opposing to the outer circumferential edge of a lower end face of the rotor, and a lower ring seal that touches the lower end face of the rotor is held in the lower ring slit,
    a respective vane of the rotor has an upper horizontal vane slit, extending in a radial direction, on an upper end face of the respective rotor vane opposing to the rear face of the top cover, and an upper horizontal vane seal that touches the rear face of the top cover is held in the upper horizontal vane slit, the respective vane of the rotor has a lower horizontal vane slit, extending in the radial direction, on a lower end face of the respective rotor vane opposing to the internal base of the housing, and a lower horizontal vane seal that touches the internal base of the housing is held in the lower horizontal vane slit, and the respective vane of the rotor has a vertical vane slit, extending in an axial direction, on a radial end face of the respective rotor vane opposing to an inner circumferential face of the housing, and a vertical vane seal that touches the inner circumferential face of the housing is held in the vertical vane slit, with an upper end face of the vertical vane seal touching a rear face of the upper horizontal vane seal, and a lower end face of the vertical vane seal touching a rear face of the lower horizontal vane seal,
    a respective segment of the housing has a vertical segment slit, extending in the axial direction, on a radial end face of the respective housing segment opposing to an outer circumferential face of the rotor, and a vertical segment seal that touches the outer circumferential face of the rotor is held in the vertical segment slit, with a top end face of the respective segment being pressure contacted to the rear face of the top cover, and a bottom end face of the respective segment being pressure contacted to the internal base of the housing,
    the respective segment of the housing has a segment top face horizontal slit, that is continuatively connected with the vertical segment slit, and extends in the radial direction, on the top end face of the respective segment opposing to the rear face of the top cover, and a segment top face horizontal seal that touches the rear face of the top cover is held in the segment top face horizontal slit, with a face of an upper end of the vertical segment seal being contacted to a rear face of the segment top face horizontal seal,
    the segment top face horizontal seal has the same cross sectional profile as that of the vertical segment seal,
    space of a rear face of the vertical segment seal and space of the rear face of the segment top face horizontal seal are communicatively connected to each other at a connected portion between the segment top face horizontal seal and the upper end of the vertical segment seal,
    the top cover has a ring-shaped upper outer ring slit on the rear face of the top cover in an outer circumferential side in concentricity with the upper ring slit at a portion opposing to an inner circumferential edge of a top end face of the housing, and an upper outer ring seal that touches the top end face of the housing is held in the upper outer ring slit,
    an inner edge of a sealing face of the segment top face horizontal seal contacts an outer edge of a ring sealing face of the upper ring seal, and an outer edge of the sealing face of the segment top face horizontal seal contacts an inner edge of the ring sealing face of the upper outer ring seal, with the ring sealing face inner edge of the upper outer ring seal simultaneously touching an outer edge of a sealing face of the upper horizontal vane seal, and
    the respective rear faces of each of the seals are applied with a pressure oil led from the working oil chambers that become high pressure side, and the respective sealing faces and the sealing face edges are pushed against respective mate faces and mate edges by hydraulic pressure.

2. A working oil chamber sealing system of a rotary vane steering gear actuator, said actuator comprising:
    a rotor into which a rudderstock is fitted,
    a housing that accommodates the rotor and forms space for working oil chambers in circumferences of the rotor, and
    a ring-shaped top cover arranged at an upper opening of the housing, with its circumferential edge portion being fixated to a housing top face circumferential edge portion by bolts, extending over a whole circumference,
    wherein:
    the rotor has plural vanes arranged protrusively on an outer periphery at equal intervals along a circumferential direction, the housing has plural segments arranged protrusively on an inner periphery at equal intervals along the circumferential direction, the space for working oil chambers is divided into plural working oil chambers by vanes and segments, the top cover has a ring-shaped upper ring slit on a rear face of the top cover at a portion opposing to an outer circumferential edge of an upper end face of the rotor, and an upper ring seal that touches the upper end face of the rotor is held in the upper ring slit, the housing has a ring-shaped lower ring slit on an internal base of the housing at a portion opposing to the outer circumferential edge of a lower end face of the rotor, and a lower ring seal that touches the lower end face of the rotor is held in the lower ring slit, a respective vane of the rotor has an upper horizontal vane slit, extending in a radial direction, on an upper end face of the respective rotor vane opposing to the rear face of the top cover, and an upper horizontal vane seal that touches the rear face of the top cover is held in the upper horizontal vane slit, the respective vane of the rotor has a lower horizontal vane slit, extending in the radial direction, on a lower end face of the respective rotor vane opposing to the internal base of the housing, and a lower horizontal vane seal that touches the internal base of the housing is held in the lower horizontal vane slit, and the respective vane of the rotor has a vertical vane slit, extending in an axial direction, on a radial end face of the respective rotor vane opposing to an inner circumferential face of the housing, and a vertical vane seal that touches the inner circumferential face of the housing is held in the vertical vane slit, with an upper end face of the vertical vane seal touching a rear face of the upper horizontal vane seal, and a lower end face of the vertical vane seal touching a rear face of the lower horizontal vane seal, a respective segment of the housing has a vertical segment slit, extending in the axial direction, on a radial end face of the respective housing segment opposing to an outer circumferential face of the rotor, and a vertical segment seal that touches the outer circumferential face of the rotor is held in the vertical segment slit, with a top end face of the respective segment being pressure contacted to the rear face of the top cover, the respective segment of the housing has a segment top face horizontal slit, that is continuatively connected with the vertical segment slit, and extends in the radial direction, on the top end face of the respective segment opposing to the rear face of the top cover, and a segment top face horizontal seal that touches the rear face of the top cover is held in the segment top face horizontal slit, with a face of an upper end of the vertical segment seal being contacted to a rear face of the segment top face horizontal seal, the segment top face horizontal seal has the same cross sectional profile as that of the vertical segment seal, space of a rear face of the vertical segment seal and space of the rear face of the segment top face horizontal seal are communicatively connected to each other at a connected portion between the segment top face horizontal seal and the upper end of the vertical segment seal, the top cover has a ring-shaped upper outer ring slit on the rear face of the top cover in an outer circumferential side in concentricity with the upper ring slit at a portion opposing to an inner circumferential edge of a top end face of the housing, and an upper outer ring seal that touches the top end face of the housing is held in the upper outer ring slit, an inner edge of a sealing face of the segment top face horizontal seal contacts an outer edge of a ring sealing face of the upper ring seal, and an outer edge of the sealing face of the segment top face horizontal seal contacts an inner edge of the ring sealing face of the upper outer ring seal, with the ring sealing face inner edge of the upper outer ring seal simultaneously touching an outer edge of a sealing face of the upper horizontal vane seal, the respective rear faces of each of the seals are applied with a pressure oil led from the working oil chambers that become high pressure side, and the respective sealing faces and the sealing face edges are pushed against respective mate faces and mate edges by hydraulic pressure the respective segment of the housing has a segment bottom face horizontal slit, that is continuatively connected with the vertical segment slit, and extends in the radial direction, on a bottom end face of the respective segment opposing to the internal base of the housing, and a segment bottom face horizontal seal is held in the segment bottom face horizontal slit, the segment bottom face horizontal seal has the same cross sectional profile as that of the vertical segment seal, space of the rear face of the vertical segment seal and space of a rear face of the segment bottom face horizontal seal are communicatively connected to each other at a connected portion between the segment bottom face horizontal seal and the bottom end face of the vertical segment seal, a sealing face of the segment bottom face horizontal seal touches the internal base of the housing, a rear face of the segment bottom face horizontal seal touches the bottom end face of the vertical segment seal, an inner edge of the sealing face of the segment bottom face horizontal seal contacts an outer edge of a ring sealing face of the lower ring seal, an outer end face of the segment bottom face horizontal seal contacts the inner circumferential face of the housing; and the rear face of the segment bottom face horizontal seal is applied with the pressure oil led from the working oil chambers that become high pressure side, and the sealing face and the inner edge of the sealing face of the segment bottom face horizontal seal are pushed against the mate face and the mate edge, respectively, by the hydraulic pressure.

* * * * *